(12) United States Patent
Zhang et al.

(10) Patent No.: US 10,659,185 B2
(45) Date of Patent: May 19, 2020

(54) PASSIVE OPTICAL NETWORK ARCHITECTURE, METHOD FOR PASSIVE OPTICAL NETWORK ARCHITECTURE TO IMPLEMENT DATA TRANSMISSION, AND OPTICAL NETWORK DEVICE

(71) Applicant: ZTE CORPORATION, Shenzhen, Guangdong Province (CN)

(72) Inventors: Weiliang Zhang, Shenzhen (CN); Liquan Yuan, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 0 days.

(21) Appl. No.: 16/093,145

(22) PCT Filed: Jun. 23, 2016

(86) PCT No.: PCT/CN2016/086907
§ 371 (c)(1),
(2) Date: Oct. 12, 2018

(87) PCT Pub. No.: WO2017/177550
PCT Pub. Date: Oct. 19, 2017

(65) Prior Publication Data
US 2019/0068310 A1    Feb. 28, 2019

(51) Int. Cl.
*H04J 14/00* (2006.01)
*H04J 14/02* (2006.01)
(Continued)

(52) U.S. Cl.
CPC .......... *H04J 14/0239* (2013.01); *H04B 10/27* (2013.01); *H04B 10/50* (2013.01);
(Continued)

(58) Field of Classification Search
CPC .. H04J 14/0239; H04J 3/1694; H04J 14/0246; H04J 14/0282; H04J 14/02;
(Continued)

(56) References Cited

U.S. PATENT DOCUMENTS

| 7,398,020 B2 * | 7/2008 | Song | H04J 3/1694 398/63 |
| 7,400,833 B2 * | 7/2008 | Song | H04J 3/1694 398/63 |

(Continued)

FOREIGN PATENT DOCUMENTS

| CN | 1794697 A | 6/2006 |
| CN | 101197637 A | 6/2008 |

(Continued)

OTHER PUBLICATIONS

China Patent Office, First Office Action dated Mar. 4, 2019 regarding China Patent Application No. 201610232176.9.
(Continued)

*Primary Examiner* — Hibret A Woldekidan
(74) *Attorney, Agent, or Firm* — Li & Cai Intellectual Property (USA) Office

(57) ABSTRACT

A PON architecture, a method for realizing data transmission with the PON architecture and an optical network device are provided. The PON architecture includes an optical line terminal (OLT) supporting multiple channels, and one or more optical network units (ONUs) supporting one or more channels under a same optical distribution network (ODN). The OLT/ONU is configured to acquire the number of channels and/or corresponding channels supported for transmitting data and transmittable states of the supported channels, distribute the data to be transmitted to one or more supported channels for transmitting, the data is preferentially transmitted on a channel with an earliest transmittable start time point, and transmission end time (Continued)

points of channels for transmitting the data are similar or data transmissions end at a transmittable end time point. The ONU/OLT is configured to receive data on channels supported by ONU/OLT itself and reassemble the data accordingly based on transmission rules.

19 Claims, 10 Drawing Sheets

(51) Int. Cl.
    *H04Q 11/00*     (2006.01)
    *H04B 10/27*     (2013.01)
    *H04B 10/50*     (2013.01)
    *H04B 10/66*     (2013.01)

(52) U.S. Cl.
    CPC .............. *H04B 10/66* (2013.01); *H04J 14/02* (2013.01); *H04J 14/0256* (2013.01); *H04J 14/0282* (2013.01); *H04Q 11/0067* (2013.01); *H04Q 2011/0064* (2013.01)

(58) Field of Classification Search
    CPC .............. H04J 14/0256; H04J 14/0227; H04J 14/0241; H04J 3/1682; H04B 10/27; H04B 10/50; H04B 10/66; H04B 10/0793; H04B 10/272; H04B 10/07; H04B 10/2537; H04Q 11/0067; H04Q 2011/0064; H04Q 2011/0079; H04L 12/12
    USPC ......... 398/79, 69, 66, 67, 68, 70, 71, 72, 25
    See application file for complete search history.

(56) References Cited

U.S. PATENT DOCUMENTS

| | | | | |
|---|---|---|---|---|
| 7,734,178 | B2* | 6/2010 | Sakamoto | H04J 14/0226 398/67 |
| 8,477,800 | B2* | 7/2013 | Kazawa | H04Q 11/0067 370/441 |
| 8,774,621 | B2* | 7/2014 | Mukai | H04B 10/07 370/230 |
| 8,879,912 | B2* | 11/2014 | Kozaki | H04L 12/12 398/58 |
| 9,088,366 | B2* | 7/2015 | Matsui | H04B 10/073 |
| 9,197,351 | B2* | 11/2015 | Doo | H04J 14/0227 |
| 9,379,877 | B2* | 6/2016 | Mizutani | H04J 3/0605 |
| 9,743,291 | B2* | 8/2017 | Jin | H04L 5/0073 |
| 10,243,693 | B2* | 3/2019 | Jung | H04B 10/07 |
| 10,389,446 | B2* | 8/2019 | Aoyama | H04B 10/50 |
| 2003/0156841 | A1 | 8/2003 | Chraplyvy | |
| 2004/0184806 | A1* | 9/2004 | Lee | H04H 20/42 398/79 |
| 2007/0140286 | A1* | 6/2007 | Kraus | H04M 11/066 370/419 |
| 2009/0136230 | A1* | 5/2009 | Bouda | H04J 14/0227 398/51 |
| 2010/0098419 | A1* | 4/2010 | Levy | H04L 12/2861 398/63 |
| 2014/0294388 | A1* | 10/2014 | Odaka | H04B 10/27 398/66 |
| 2015/0326318 | A1* | 11/2015 | Yamashita | H04L 12/4625 398/58 |
| 2017/0237488 | A1* | 8/2017 | Aoyama | H04M 11/00 398/118 |
| 2019/0109665 | A1* | 4/2019 | Luo | H04J 14/0227 |

FOREIGN PATENT DOCUMENTS

| | | |
|---|---|---|
| CN | 101197637 A | 6/2008 |
| CN | 10145951 A | 6/2009 |
| CN | 102015822 A | 5/2011 |
| CN | 102804701 A | 11/2012 |
| WO | 2014107244 A1 | 7/2014 |

OTHER PUBLICATIONS

China Patent Office, Second Office Action dated Aug. 2, 2019 regarding China Patent Application No. 201610232176.9.

European Patent Office, Extended European Search Report dated Apr. 9, 2019 regarding the European patent application No. 16898365.8.

Yuanqiu Luo Futurewei, "TWDM-PON Channel Bonding", ITU-T Draft: Study Period 2013-2016, International Telicommunciation Union, Genva; Ch, vol. 2/15, Oct. 5, 2015, pp. 1-5, KP044147508.

* cited by examiner

PASSIVE OPTICAL NETWORK ARCHITECTURE, METHOD FOR PASSIVE OPTICAL NETWORK ARCHITECTURE TO IMPLEMENT DATA TRANSMISSION, AND OPTICAL NETWORK DEVICE

CROSS-REFERENCE TO RELATED APPLICATIONS

The present application is a U.S. National Phase Entry of International PCT Application No. PCT/CN2016/086907 having an international filing date of Jun. 23, 2016, which claims priority to Chinese Patent Application No. 201610232176.9 filed on Apr. 14, 2016. The present application claims priority and the benefit of the above-identified applications and the above-identified applications are incorporated by reference herein in their entirety.

TECHNICAL FIELD

Embodiments of the present disclosure relate to, but are not limited to, optical communication technology, in particular to a passive optical network (PON) architecture, a method for realizing data transmission with the PON architecture, and an optical network device.

BACKGROUND

With the rapid development of broadband services, users' demand for access network bandwidth has greatly increased. passive optical network (PON) is an important means for user access at present. As shown in FIG. 1, in the existing PON system structure, the local optical line terminal (OLT) is connected to an optical splitter through trunk optical fibers, the optical splitter is connected to multiple user optical network units (ONU) through branch optical fibers, and the OLT and ONUs communicate through a pair of wavelengths.

At present, the OLT can use multi-wavelength optical modules to configure four or more uplink and downlink wavelengths. For a scenario where the OLT supports multiple wavelengths, as shown in FIG. 2, in a downlink direction, multiple different wavelengths $\lambda_{d0}, \lambda_{d1} \ldots \lambda_{dn}$ are transmitted to an optical wavelength distribution network (OWDN) after combining at OLT and allocated to each ONU according to different wavelengths. In an uplink direction, different users ONU transmit different optical wavelengths $\lambda_{u0}, \lambda_{u1} \ldots \lambda_{un}$ to OWDN for combining and then transmit the optical wavelengths to OLT. In this way, the uplink and downlink transmission of the optical signal is completed. The downlink wavelength $\lambda_{di}$ (i=0, 1, ... n) and the uplink wavelength $\lambda_{ui}$ (i=0, 1, ... n) can work in the same band or in different bands.

As can be seen from FIG. 2, in order to adapt to the OLT supporting multiple wavelengths, the user side needs to deploy a corresponding number of ONUs supporting single wavelengths to correspond to each wavelength respectively. In addition, the ONU can adjust the working downlink wavelength $\lambda_{di}$ (i=0, 1, ... n) and uplink wavelength $\lambda_{ui}$ (i=0, 1, ... n) as needed with the cooperation of the OLT. With the development of network and service, ONU needs to support more throughput and bandwidth. The number of wavelengths supported by ONU has gradually grown from one to multiple, and the wavelengths supported by ONU are also flexible and changeable. There is no relevant scheme for achieving ONU supporting different numbers of wavelengths and different wavelengths under the same ODN and making full use of bandwidth.

SUMMARY

The following is a summary of the subject matter described in detail in this document. This summary is not intended to limit the protection scope of the claims.

Embodiments of the present disclosure provide a passive optical network architecture, a method for realizing data transmission with the PON architecture and an optical network device, control by OLT supporting multiple wavelengths on ONU supporting different numbers of wavelengths and different wavelengths is realized, flexible binding of channels is realized, thus making full use of bandwidth.

In one aspect, the present disclosure provides a passive optical network (PON) architecture, which includes an optical line terminal (OLT) supporting multiple channels and one or more optical network units (ONU) supporting one or more channels under a same optical distribution network (ODN).

The OLT/ONU is configured to acquire a number of channels and/or corresponding channels supported for transmitting data and transmittable states of the supported channels, distribute the data to be transmitted to one or more supported channels for transmitting, herein the data is preferentially transmitted on a channel with an earliest transmittable start time point, and transmission end time points of channels for transmitting the data are similar or data transmissions end at a transmittable end time point.

The ONU/OLT is configured to receive data on channels supported by the ONU/OLT itself and reassemble the data accordingly based on transmission rules.

In an exemplary embodiment, the OLT is configured to acquire a destination ONU of the data to be transmitted, a number of channels and/or corresponding channels supported by the destination ONU, and transmittable states of the supported channels;

according to the acquired number of channels of the destination ONU and the transmittable states of the channels, distribute the data to be transmitted to one or more supported channels for transmitting, herein the data is preferentially transmitted on the channel with the earliest transmittable start time point, and the transmission end time points of the channels for transmitting the data are similar or data transmissions end at the transmittable end time point.

In an exemplary embodiment, that the data is preferentially transmitted on the channel with the earliest transmittable start time point, and the transmission end time points of the channels for transmitting the data are similar or data transmissions end at the transmittable end time point, includes:

when the destination ONU supports a single channel, the data to be transmitted starts to be transmitted on the channel from the transmittable start time point, and a sequence number and/or length of the data to be transmitted is indicated;

when the destination ONU supports two or more channels, if the data to be transmitted is completely transmitted on a channel with the earliest transmittable start time point, the data to be transmitted is transmitted on the channel and the sequence number and/or length of the data to be transmitted is indicated; when the data to be transmitted can not be completely transmitted on a channel, the data to be transmitted is fragmented to be distributed on multiple channels for transmitting, and the sequence number, fragmentation situation and/or length of the data to be transmitted on each channel are indicated.

In an exemplary embodiment, the OLT is further configured to encapsulate the data or data fragments to be transmitted on each channel into data frames and transmit the data frames to the destination ONU, and carry at least one of the following in the data frame: data sequence number, data fragmentation situation, and length.

In an exemplary embodiment, the destination ONU is configured to:

when the destination ONU supports a single channel, receive data frames on the channel and analyze to acquire corresponding data;

when the destination ONU supports two or more channels, receive data frames on the channels supported by the destination ONU itself according to channel information and/or address information, and reassemble the data according to the data sequence number and data fragmentation situation in the data frame.

In an exemplary embodiment, the OLT is further configured to allocate an uplink bandwidth to an ONU on each channel supported by the ONU; herein, bandwidths allocated to one ONU supporting multiple channels overlap.

In an exemplary embodiment, the ONU is further configured to acquire the uplink bandwidth allocated by the OLT on the channels supported by the ONU itself and the transmittable states of the supported channels, distribute the data to be transmitted to one or more supported channels with the uplink bandwidth for transmitting, herein the data is preferentially transmitted on the channel with the earliest transmittable start time point, and the transmission end time points of the channels for transmitting the data are similar or data transmissions end at the transmittable end time point.

In an exemplary embodiment, that the data is preferentially transmitted on the channel with the earliest transmittable start time point, and the transmission end time points of the channels for transmitting the data are similar or data transmissions end at the transmittable end time point, includes:

when the destination ONU supports a single channel or acquires bandwidth allocation on only one channel, the data to be transmitted starts to be transmitted on the channel from the transmittable start time point and the sequence number and/or length of the data to be transmitted is indicated;

when the destination ONU supports two or more channels and acquires bandwidth allocation on the two or more channels, if the data to be transmitted is completely transmitted on a channel with the earliest transmittable start time point, the data to be transmitted is transmitted on the channel and the sequence number and/or length of the data to be transmitted is indicated; when the data to be transmitted can not be completely transmitted on a channel, the data to be transmitted is fragmented to be distributed on multiple channels for transmitting, and the sequence number, fragmentation situation and/or length of the data to be transmitted on each channel are indicated.

In an exemplary embodiment, the ONU is further configured to encapsulate the data or data fragments to be transmitted on each channel into data frames and transmit the data frames to the destination OLT, and carry at least one of the following in the data frame: data sequence number, data fragmentation situation, and length.

In an exemplary embodiment, the OLT is further configured to receive data on a channel supported by itself, collect data frames sent by an ONU according to the ONU information and/or the bandwidth allocation, and reassemble the received data accordingly based on data transmission rules.

In an exemplary embodiment, that the transmission end time points of the channels for transmitting the data are similar is: the transmission end time points of the channels for transmitting the data are the same; or, a difference between the transmission end time points of the channels for transmitting the data is less than a preset time difference threshold.

In an exemplary embodiment, if there are multiple channels with the same earliest transmittable start time point, the data is preferentially transmitted evenly on the multiple channels.

In an exemplary embodiment, when the number of channels increases at a next transmittable start time point and/or decreases at the transmittable end time point, the data continues to be transmitted evenly on updated channels until the data transmission is completed or all channels reach the transmission end time points.

An embodiment of the present disclosure further provides a method for realizing data transmission with PON architecture, including:

acquiring, by an OLT, a number of channels and/or corresponding channels supported for transmitting data and transmittable states of the supported channels, distributing the data to be transmitted to one or more supported channels for transmitting, herein the data is preferentially transmitted on a channel with an earliest transmittable start time point, and transmission end time points of channels for transmitting the data are similar or data transmissions end at a transmittable end time point;

herein the OLT supports multiple channels, an ONU supports one or more channels and is located under a same ODN.

In an exemplary embodiment, that the data is preferentially transmitted on a channel with an earliest transmittable start time point, and transmission end time points of channels for transmitting the data are similar, includes:

a destination ONU of the data to be transmitted, a number of channels and/or corresponding channels supported by the destination ONU, and transmittable states of the supported channels are acquired;

when the destination ONU supports a single channel, the data to be transmitted starts to be transmitted on the channel from the transmittable start time point, and a sequence number and/or length of the data to be transmitted is indicated;

when the destination ONU supports two or more channels, the data to be transmitted can be transmitted on a channel with the earliest transmission start time point, the sequence number and/or length of the data to be transmitted is indicated; when the data to be transmitted cannot be transmitted on a channel, the data to be transmitted is fragmented to be distributed on multiple channels for transmitting, and the sequence number and fragmentation situation and/or length of the data to be transmitted on each channel are indicated.

In an exemplary embodiment, the method further includes: encapsulating, by the OLT, the data or data fragments to be transmitted on each channel into data frames, transmitting the data frames to the destination ONU, and carrying at least one of the following in the data frame: data sequence number, data fragmentation situation and length.

In an exemplary embodiment, the method further includes:

allocating, by the OLT, an uplink bandwidth to an ONU on each channel supported by the ONU, herein bandwidths allocated to one ONU supporting multiple channels overlap; and receiving data on a channel supported by itself, collecting data frames sent by an ONU according to the ONU information and/or the bandwidth allocation, and reassembling the received data accordingly based on data transmission rules.

In an exemplary embodiment, if there are multiple channels with the same earliest transmittable start time point, the method further includes: preferentially transmitting, by the OLT, the data evenly on the multiple channels.

In an exemplary embodiment, if the number of channels increases at a next transmittable start time point and/or decreases at the transmittable end time point, the method further includes:

continuing, by the OLT, to transmit the data evenly on updated channels until the data transmission is completed or all channels reach the transmission end time points.

In an exemplary embodiment, that the transmission end time points of the channels for transmitting the data are similar is: the transmission end time points of the channels for transmitting the data are the same; or a difference between the transmission end time points of the channels for transmitting the data is less than a preset time difference threshold.

In another aspect, an embodiment of the present disclosure further provides a method for realizing data transmission with PON architecture, including: when an ONU supports a single channel, receiving a data frame on the channel and analyzing to acquire corresponding data;

when an ONU supports two or more channels, receiving data frames on the channels supported by the ONU itself according to channel information and/or address information, and reassembling the data according to a data sequence number and data fragmentation situation in the data frame.

In an exemplary embodiment, the method further includes:

acquiring, by the ONU, an uplink bandwidth allocated by an optical line terminal OLT on the channels supported by the ONU itself and transmittable states of the supported channels, distributing the data to be transmitted to one or more supported channels with the uplink bandwidth for transmitting, herein the data is preferentially transmitted on the channel with an earliest transmittable start time point, and transmission end time points of channels for transmitting the data are similar or data transmissions end at a transmittable end time point.

In an exemplary embodiment, that the data is preferentially transmitted on the channel with an earliest transmittable start time point, and transmission end time points of channels for transmitting the data are similar or data transmissions end at a transmittable end time point, includes:

when a destination ONU supports a single channel or acquires bandwidth allocation on only one channel, the data to be transmitted starts to be transmitted on the channel from the transmittable start time point and the sequence number and/or length of the data to be transmitted is indicated;

when a destination ONU supports two or more channels and acquires bandwidth allocation on the two or more channels, if the data to be transmitted is completely transmitted on a channel with the earliest transmittable start time point, the data to be transmitted is transmitted on the channel and the sequence number and/or length of the data to be transmitted is indicated; when the data to be transmitted cannot be completely transmitted on a channel, the data to be transmitted is fragmented to be distributed on multiple channels for transmitting, and the sequence number, fragmentation situation and/or length of the data to be transmitted on each channel are indicated.

In an exemplary embodiment, the method further includes: encapsulating, by the ONU, the data or data fragments to be transmitted on each channel into data frames, transmitting the data frames to the destination OLT, and carrying at least one of the following in the data frame: data sequence number, data fragmentation situation and length.

In an exemplary embodiment, if there are multiple channels with the same earliest transmittable start time point, the method further includes: preferentially transmitting, by the ONU, the data evenly on the multiple channels.

In an exemplary embodiment, if the number of channels increases at a next transmittable start time point and/or decreases at the transmittable end time point, the method further includes:

continuing, by the ONU, to transmit the data evenly on updated channels until the data transmission is completed or all channels reach the transmission end time points.

In another aspect, an embodiment of the present disclosure further provides an optical network device, including a first acquisition module and a first processing module.

The first acquisition module is configured to acquire a number of channels and/or corresponding channels supported for transmitting data and transmittable states of the supported channels.

The first processing module is configured to distribute the data to be transmitted to one or more supported channels for transmitting, herein the data is preferentially transmitted on a channel with an earliest transmittable start time point, and transmission end time points of channels for transmitting the data are similar or data transmissions end at a transmittable end time point.

In an exemplary embodiment, the first acquisition module is configured to acquire a destination optical network unit ONU of the data to be transmitted, a number of channels and/or corresponding channels supported by the destination ONU, and transmittable states of the supported channels.

The first processing module is configured to:

when the destination ONU supports a single channel, transmit the data to be transmitted on the channel and indicate a sequence number and/or length of the data to be transmitted;

when the destination ONU supports two or more channels, if the data to be transmitted can be completely transmitted on a channel with the earliest transmission start time point, transmit the data to be transmitted on that channel, indicate the sequence number and/or length of the data to be transmitted; when the data to be transmitted cannot be completely transmitted on a channel, fragment the data to be transmitted to be distributed on multiple channels for transmitting, and indicate the sequence number, fragmentation situation and/or length of the data to be transmitted on each channel.

In an exemplary embodiment, the first processing module is further configured to encapsulate the data or data fragments to be transmitted on each channel into data frames and transmit the data frames to the destination ONU, and carry at least one of the following in the data frame: data sequence number, data fragmentation situation, and length.

In an exemplary embodiment, the first processing module is further configured to allocate an uplink bandwidth to an ONU on each channel supported by the ONU, herein bandwidths allocated to one ONU supporting multiple channels overlap; receive data on a channel supported by itself, collect data frames sent by an ONU according to the ONU information and/or the bandwidth allocation, and reassemble the received data accordingly based on data transmission rules.

In an exemplary embodiment, the first processing module is further configured to, when there are multiple channels with the same earliest transmittable start time point, preferentially transmit the data evenly on the multiple channels.

In an exemplary embodiment, the first processing module is further configured to when the number of channels increases at a next transmittable start time point and/or decreases at the transmittable end time point, continue to transmit the data evenly on updated channels until the data transmission is completed or all channels reach the transmission end time points.

In an exemplary embodiment, that the transmission end time points of the channels for transmitting the data are similar is: the transmission end time points of the channels for transmitting the data are the same; or a difference between the transmission end time points of the channels for transmitting the data is less than a preset time difference threshold.

In an exemplary embodiment, the optical network device is provided in an OLT or is a separate entity.

In another aspect, an embodiment of the present disclosure further provides an optical network device, which includes a second acquisition module and a second processing module.

The second acquisition module is configured to receive data on a channel supported by itself; acquire a number of channels and/or corresponding channels supported for transmitting data and the transmittable states of the supported channels.

The second processing module is configured to receive data frames according to channel information and/or address information in the received data frames and local channel information and/or address information of an optical network unit ONU, and reassemble received data fragments according to a sequence number and fragmentation situation in the data frame.

In an exemplary embodiment, the second acquisition module is configured to:

when an ONU where the optical network device itself is located supports a single channel, receive data frames on the channel and analyze to acquire corresponding data;

when an ONU where the optical network device itself is located supports two or more channels, receive data frames on the channels supported by itself according to channel information and/or address information, and reassemble the data according to the sequence number and data fragmentation situation in the data frame.

In an exemplary embodiment, the second acquisition module is further configured to acquire an uplink bandwidth allocated by an optical line terminal OLT on each channel supported by the ONU where the optical network device itself is located and transmittable states of the supported channels;

the second processing module is also configured to distribute the data to be transmitted to one or more supported channels, herein the data is preferentially transmitted on the channel with an earliest transmittable start time point, and transmission end time points of channels for transmitting the data are similar or data transmissions end at a transmittable end time point;

when the ONU where the optical network device itself is located supports a single channel or acquires bandwidth allocation on only one channel, start to transmit the data to be transmitted on the channel from the transmittable start time point and indicate the sequence number and/or length of the data to be transmitted;

when the ONU where the optical network device itself is located supports two or more channels and acquires bandwidth allocation on the two or more channels, if the data to be transmitted is completely transmitted on a channel with the earliest transmission start time point, transmit the data to be transmitted on the channel and indicate the sequence number and/or length of the data to be transmitted; when the data to be transmitted cannot be completely transmitted on a channel, fragment the data to be transmitted to be distributed on multiple channels for transmitting, and indicate the sequence number, fragmentation situation and/or length of the data to be transmitted on each channel.

In an exemplary embodiment, the second processing module is further configured to: when there are multiple channels with the same earliest transmittable start time point, preferentially transmit the data evenly on the multiple channels.

In an exemplary embodiment, the second processing module is further configured to: when the number of channels increases at a next transmittable start time point and/or decreases at the transmittable end time point, continue to transmit data evenly on updated channels until the data transmission is completed or all channels reach the transmission end time points.

In an exemplary embodiment, the apparatus is provided in an ONU or is a separate entity.

In still another aspect, a computer readable storage medium is provided by an embodiment of the present disclosure, having computer executable instructions stored therein, which are used for executing any of the methods for realizing data transmission with passive optical network PON architecture described above.

Compared with the existing art, the PON architecture provided by the present application includes an OLT supporting multiple channels, and one or more ONUs supporting one or more channels under a same; herein, the OLT/ONU is configured to acquire the number of channels and/or corresponding channels supported for transmitting data and transmittable states of the supported channels, distribute the data to be transmitted to one or more supported channels for transmitting, herein the data is preferentially transmitted on a channel with an earliest transmittable start time point, and transmission end time points of channels for transmitting the data are similar or data transmissions end at a transmittable end time point; the ONU/OLT is configured to receive data on channels supported by the ONU/OLT itself and reassemble the data accordingly based on transmission rules. Through the scheme provided by the embodiment of the present disclosure, control by OLT supporting multiple wavelengths on ONU supporting different numbers of wavelengths and different wavelengths is realized, flexible binding of channels and full use of bandwidth can be achieved.

Other features and advantages of the present disclosure will be set forth in the following description and would partly become apparent from the description, or may be learned by practice of the present disclosure. The purposes and other advantages of the present disclosure can be realized and obtained through the structure particularly pointed out in the description, claims and accompanying drawings.

After the drawings and detailed description are read and understood, other aspects can be understood.

BRIEF DESCRIPTION OF DRAWINGS

The accompanying drawings described herein are intended to provide a further understanding of the present disclosure and form a part of the present application. The illustrative embodiments of the present disclosure and the description thereof are used to explain the present disclosure but do not constitute an improper definition of the present disclosure. In the drawings.

DETAILED DESCRIPTION

Embodiments of the present disclosure will be described in detail below in conjunction with the accompanying drawings so as to make the object, scheme and advantage of the present disclosure more clear. It should be illustrated that the embodiments in the present application and features in the embodiments can be combined with each other arbitrarily without conflict.

Figure 1:
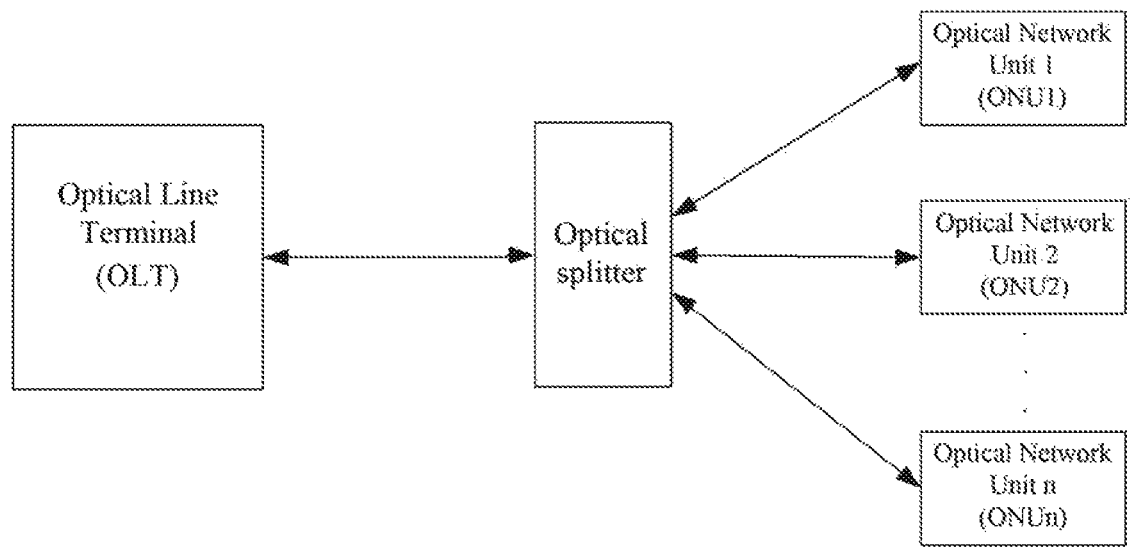
FIG. 1 is a composition framework diagram of PON system in the existing art.
Figure 2:
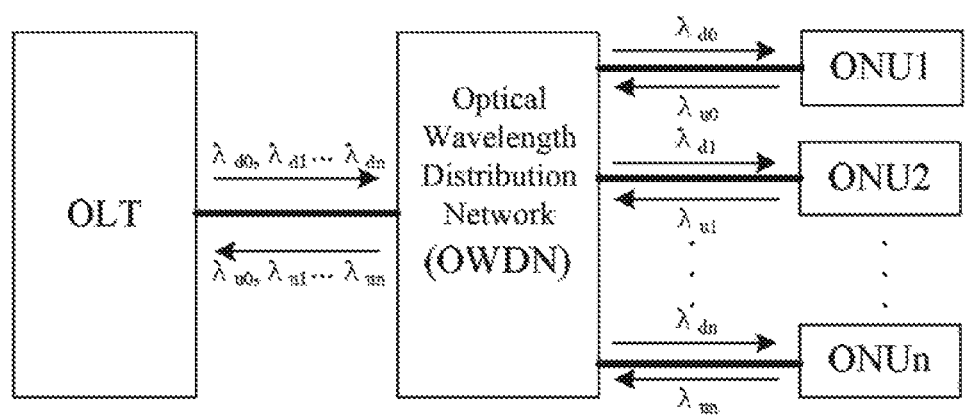
FIG. 2 is a schematic diagram of an uplink and downlink transmission scenario where OLT supports multiple wavelengths in the existing art.
Figure 3:
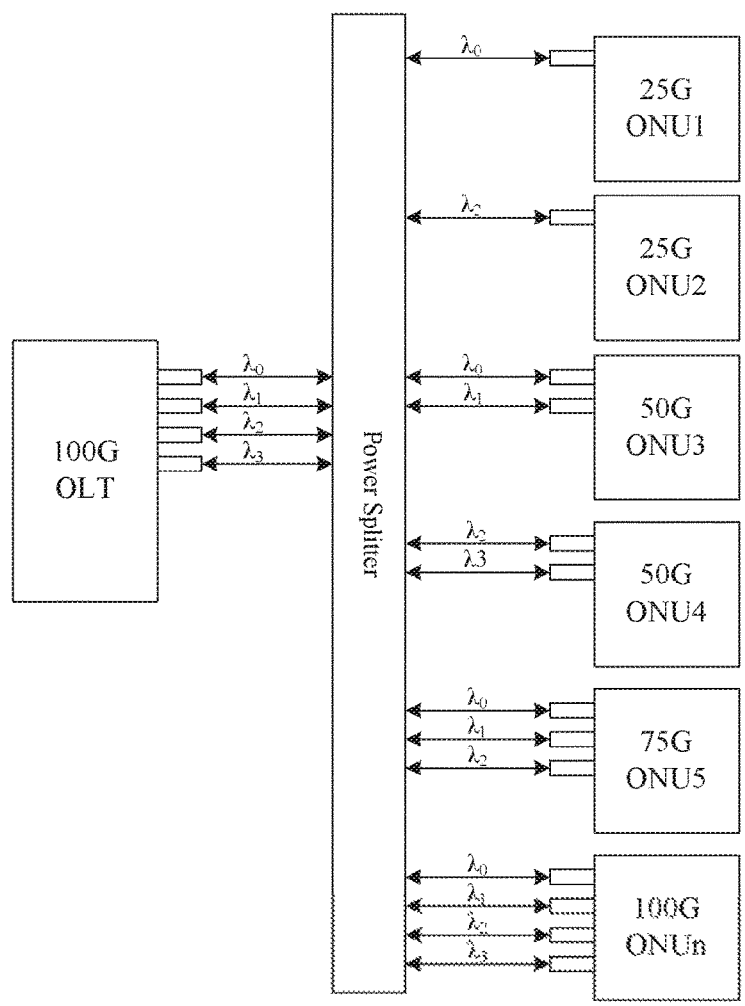
FIG. 3 is a schematic diagram of a transmission scenario in which OLT supports multiple wavelengths and ONU supports different numbers of wavelengths and different wavelengths according to an embodiment of the present disclosure.

IEEE Next Generation Ethernet Passive Optical Network (NG EPON) and ITU-T NG-PON 2 are being standardized. OLT supports multiple channels, and ONU supports one or more of them. The number of channels and channels supported by different ONUs may be different. FIG. 3 is a schematic diagram of a transmission scenario where OLT supports multiple wavelengths and ONU supports different numbers of wavelengths and different wavelengths. For example, when OLT supports channels 0-3, a single-channel ONU can support a channel 0, 1, 2 or 3, and channels supported by different single-channel ONUs can be the same or different. The 2-channel ONU can support two of channels 0, 1, 2 and 3, such as channels 0 and 1, channels 0 and 2, channels 0 and 3, channels 1 and 2, channels 1 and 3, channels 2 and 3, etc. Different 2-channel ONUs can support the same or different channels. The 3-channel ONU can support three of channels 0, 1, 2 and 3, such as channels 0, 1 and 2, channels 0, 1 and 3, channels 0, 2 and 3, channels 1, 2 and 3, etc. Different 3-channel ONUs can support the same or different channels. 4-channel ONU supports channels 0, 1, 2 and 3. The OLT needs to support communication with ONUs which have different number of channels and different specific channels, as shown in FIG. 3, it is only an example and is not used to limit the protection scope of the present disclosure.

It should be noted that the rate of each wavelength may or may not be the same, and the uplink rate and downlink rate of each wavelength may or may not be the same, and the scheme provided by an embodiment of the present disclosure may be adopted.

The PON architecture of the embodiment of the present disclosure at least includes an OLT supporting multiple channels and one or more ONU supporting one or more channels under the same ODN.

The OLT/ONU is configured to acquire the number of channels and/or the corresponding channels supported for transmitting data, as well as the transmittable states of the supported channels (including a transmittable start time point, or a transmittable start time point and a transmittable end time point), distribute the data to be transmitted to one or more supported channels for transmitting according to transmission rules. The data is preferentially transmitted on a channel with the earliest transmittable start time point, and transmission end time points of channels for transmitting the data are similar or data transmissions end at a transmittable end time point. Further, if there are multiple channels with the same earliest transmittable start time point, the data is preferentially transmitted evenly on these channels. If the number of channels increases at a next transmittable start time point and/or decreases at the transmittable end time point, the data continues to be transmitted evenly on updated channels until the data transmission is complete or all channels reach the transmission end time points.

The ONU/OLT is configured to receive data on channels supported by the ONU/OLT itself and reassemble the data accordingly based on transmission rules.

Herein, that the transmission end time points of the channels for transmitting the data are similar means that the transmission end time points of the channels for transmitting the data are the same; or, a difference between the transmission end time points of the channels for transmitting the data is less than a preset time difference threshold, where the time difference threshold can be several bytes, such as 1 byte, 4 bytes, etc.

In an embodiment of the present disclosure, if there are multiple channels with the same earliest transmittable start time point or the data are transmitted at the next transmittable start time point, then data is transmitted evenly on the multiple channels. If the data can be completely and evenly distributed, the transmission end time point of each channel is the same; If the data cannot be completely and evenly distributed, the leftover is be distributed to multiple channels which are as much as possible. Therefore, the transmission end time point of each channel is similar, and the method for generating and distributing the leftover may be related to the granularity for transmitting data, which may be 1 byte, 4 bytes and so on.

It should be noted that the number of channels in the PON architecture of the embodiment of the present disclosure may be equal to the number of wavelengths, the number of optical fibers, or the number of wavelengths contained in multiple optical fibers.

In the downlink direction:

The OLT is configured to acquire a destination ONU of the data to be transmitted, the number of channels and/or the corresponding channels supported by the destination ONU, and the transmittable states of the supported channels (including a transmittable start time point, or a transmittable start time point and a transmittable end time point); according to the acquired number of channels of the destination ONU and the transmittable states of the channels, distribute the data to be transmitted to one or more supported channels for transmitting according to transmission rules. The data is preferentially transmitted on the channel with the earliest transmittable start time point, and the transmission end time points of the channels for transmitting the data are similar or data transmissions end at the transmittable end time point. If there are multiple channels with the same earliest transmittable start time, the data is preferentially transmitted evenly on these channels. If the number of channels increases at the next transmittable start time point and/or decreases at the transmittable end time point, the data continues to be transmitted evenly on updated channels until the data transmission is complete or all channels reach the transmission end time points. Here, that the transmission end time points of the channels for transmitting the data are similar means that the transmission end time points of the channels for transmitting the data are the same; or, a difference between the transmission end time points of the channels for transmitting the data is less than a preset time difference threshold.

The destination ONU is configured to receive data on channels supported by the destination ONU itself and reassemble the data accordingly based on transmission rules.

The OLT is specifically configured as follows. When the destination ONU is a single-channel ONU, that is, the destination ONU supports a single channel, the data to be transmitted starts to be directly and completely transmitted on the channel from the transmittable start time point, and the sequence number and/or length of the data is indicated, and there is no fragmentation at this time. When the destination ONU is a two-or-more-channel ONU, i.e. the destination ONU supports two or more channels, if data may be completely transmitted on a certain channel (the transmittable start time point of this channel is the earliest, and the transmittable start time points of other channels are later than that of the channel, and the data transmission may not reach transmittable start time points of other channels), then data is completely transmitted on this channel and the sequence number and/or length of data is indicated, and there is no fragmentation at this time. If the data cannot be completely transmitted on a certain channel, then the data is fragmented to be distributed on multiple channels for transmitting, the sequence number and fragmentation situation and/or length of the data on each channel are indicated.

The next generation passive optical network (NG-PON 2) is an important branch of PON technology evolution. In NG-PON 2, as can be seen from relevant protocols, the encapsulation process of data transmission roughly includes: data is encapsulated into a new generation PON encapsulation method (XGEM, XG-PON Encapsulation Method) frame, the XGEM frame includes overhead and payload, and the overhead carries the XGEM port ID; multiple XGEM frames are re-encapsulated into a superframe, which includes overhead and payload, the overhead includes physical layer OAM (PLOAM) messages, transmission bandwidth mapping (BWmap) bandwidth allocation, etc. The superframe is then encapsulated in a physical layer frame (PHY frame) after processing such as FEC. The physical frame includes a frame header and a payload, and the frame header is used by the receiver to detect a start position of the physical frame. In addition, EPON/10G EPON is another important branch of PON evolution. As can be seen from the related protocols, the encapsulation process of data transmission roughly includes: data is encapsulated into media access control (MAC) frames, MAC frames include overhead and payload, multiple MAC frames are encapsulated into physical frames, and the physical frames include overhead, payload frame headers and payload.

The OLT is also configured to encapsulate the data or data fragments to be transmitted on each channel into data frames and then transmit the data frames to the destination ONU, and carry at least one of the following in the data frame: data sequence number, data fragmentation situation and length.

Accordingly, the destination ONU is specifically configured to:

When the destination ONU is a single-channel ONU, that is, the destination ONU supports a single channel, receive the data frames on the channel and analyze to acquire the corresponding data. If a data frame is received according to a logical channel number such as XGEM Port ID/LLID, there is no need to check the sequence number and fragmentation situation in the data frame.

When the destination ONU is a two-or-more-channel ONU, that is, the destination ONU supports two or more channels, the destination ONU receives data frames based on channel information and/or address information on the channels supported by the destination ONU itself, such as receiving data frames based on logical channel numbers such as XGEM Port ID/LLID and analyzing to acquire the data in the data frames, and reassembles the data according to the sequence numbers and fragmentation situations in the data frames.

In the uplink direction:

The OLT is further configured to allocate uplink bandwidth to an ONU, i.e., allocating bandwidth on each channel supported by the ONU, herein the bandwidths allocated to one ONU supporting multiple channels overlap; receive data on a channel supported by itself and reassemble the received data. Herein, the ONU supports multiple channels such that the ONU can support higher throughput. The uplink direction is similar to the downlink direction that data transmission is distributed on multiple channels as much as possible and there is an overlap in bandwidths. However, the downlink data transmission and bandwidth scheduling can be regarded as being performed simultaneously, while in the uplink direction, the ONU transmits data within the allocated bandwidth only after the OLT allocates bandwidth to the ONU. If there is no overlap in the uplink bandwidth in multiple channels, the effect is equivalent to allocating multiple bandwidths in the same channel and the throughput of the ONU cannot be improved. The bandwidths allocated to the same ONU overlap as much as possible, which is implemented by the dynamic bandwidth allocation (DBA) algorithm on the OLT side. The DBA algorithm would take the bandwidth request of each ONU into consideration comprehensively to acquire a bandwidth allocation result suitable for all ONUs under the OLT, and the bandwidth allocation result is sent to each ONU.

As such, the destination ONU is also configured to acquire the uplink bandwidth allocated by the OLT on each channel, acquire the number of channels and/or corresponding channels supported for transmitting data, and the transmittable states of the supported channels, including the transmittable start time point and the transmittable end time point, i.e., the start time point and end time point of bandwidth allocation, and distribute the data to be transmitted to one or more supported channels allocated with the uplink bandwidth for transmitting. Herein the data is preferentially transmitted on the channel with the earliest transmittable start time point, and the transmission end time points of the channels for transmitting the data are similar or data transmissions end at the transmittable end time point. If there are multiple channels with the same transmittable start time point, the data is preferentially transmitted evenly on these channels. If the number of channels increases at the next transmittable start time point and/or decreases at the transmittable end time point, the data continues to be transmitted evenly on the updated channels until the data transmission is completed or all channels reach the transmission end time points.

For ease of the following description, the number of channels being equal to the number of wavelengths is taken as an example, but is not intended to limit the protection scope of the present disclosure.

Based on the PON architecture of an embodiment of the present disclosure, the method for realizing data transmission includes:

For the OLT side, before the data to be transmitted enters a queue,

First, the destination ONU to which the data is sent, the number of wavelengths supported by the destination ONU and the transmittable state at each wavelength are acquired. Here, the data transmission request submitted by the service layer carries the data to be transmitted, the wavelength information transmitted by the data and/or the destination ONU information, etc. The OLT can extract the destination ONU and the number of supported wavelengths and the transmittable state at each wavelength according to the data transmission request. It should be noted that data transmission usually has queue management, which can be either an actual module or a virtual module. For example, when combined with other modules, the data will be put into the queue first, and then the sender would get the data from the queue for transmission.

Then, according to the acquired number of wavelengths of the destination ONU and the transmittable states at the supported wavelengths, the data to be transmitted is distributed on one or more supported wavelengths according to the transmission rules for transmitting, the data is preferentially transmitted at the wavelength with the earliest transmittable start time point, and the transmission end time points at the wavelengths for transmitting the data are similar or data transmissions end at the transmittable end time point.

Specifically,

When the transmitting end is OLT and the receiving end is ONU, i.e. in the downlink direction, the method specifically includes:

The OLT acquires the destination ONU of the data to be transmitted, the number of channels and/or the corresponding channels supported by the destination ONU, and the transmittable states of the supported channels. According to the acquired number of channels of the destination ONU and the transmittable states of the channels, the data to be transmitted is distributed to one or more supported channels for transmitting according to the transmission rules. The data is preferentially transmitted on the channel with the earliest transmittable start time point, and the transmission end time points of the channels for transmitting the data are similar or data transmissions end at the transmittable end time point. Further, if there are multiple wavelengths with the same earliest transmittable start time points, the data is preferentially transmitted evenly at these wavelengths. If the number of channels increases at the next transmittable start time point and/or the number of wavelengths decreases at the transmittable end time point, the data continues to be transmitted evenly at the updated wavelengths until the data transmission is completed or all wavelengths reach the transmission end time points.

Here, that the transmission end time points of the channels for transmitting the data are similar means that the transmission end time points of the channels for transmitting the data are the same; or, a difference between the transmission end time points of the channels for transmitting the data is less than a preset time difference threshold.

Accordingly,

When the destination ONU is a single-wavelength ONU, that is, the destination ONU supports a single wavelength, data frames are received at that wavelength to analyze to acquire the corresponding data. If a data frame is received according to a logical channel number such as XGEM Port ID/LLID, there is no need to check the sequence number and fragmentation situation in the data frame.

When the destination ONU is a two-or-more-wavelength ONU, that is, the destination ONU supports two or more wavelengths, the destination ONU receives data frames based on channel information and/or address information at the wavelengths supported by the destination ONU itself, such as receiving data frames based on logical channel numbers such as XGEM Port ID/LLID and analyzing to acquire the data in the data frames, and reassembles the data according to the sequence numbers and fragmentation situations in the data frames.

When the transmitting end is an ONU and the receiving end is an OLT, that is, in the uplink direction, the method specifically includes:

OLT allocates uplink bandwidth to an ONU, and bandwidth is allocated on each channel supported by ONU. The bandwidths allocated to one ONU supporting multiple channels overlap. Herein, the bandwidths allocated to the same ONU overlap, and the DBA algorithm on the OLT side is used for implementing. The DBA algorithm would take the bandwidth request of each ONU into consideration comprehensively to acquire a bandwidth allocation result suitable for all ONUs under the OLT, and the bandwidth allocation result is sent to each ONU.

The ONU acquires the uplink bandwidth allocated by the OLT on each channel, the number of channels and/or the corresponding channels supported for transmitting data, and the transmittable states of the supported channels, including the transmittable start time point and the transmittable end time point, i.e., the start time point and the end time point of bandwidth allocation, and distributes the data to be transmitted to one or more supported channels. The data is preferentially transmitted on the channel with the earliest transmittable start time point, and the transmission end time points of the channels for transmitting the data are similar or data transmissions end at the transmittable end time point. Further, if there are multiple channels with the same transmittable start time, the data is preferentially transmitted evenly on these channels. If the number of channels increases at the next transmittable start time point and/or decreases at the transmittable end time point, the data continues to be transmitted evenly on the updated channels until the data transmission is completed or all channels reach the transmission end time points.

The OLT receives data on a channel supported by the OLT itself, collects data frames sent by an ONU according to the ONU information and/or the bandwidth allocation, and reassembles the received data accordingly based on the data transmission rules.

In implementing data transmission based on the PON architecture of the present disclosure, firstly, the number of channels for transmitting and the length of data transmitted on each channel are calculated according to the data to be transmitted and situations of the channel supported for transmitting data, such as the number of channels and/or the corresponding channels, and the transmittable states of the supported channels, etc. According to the length of data transmitted on each channel, the data to be transmitted is fragmented and transmitted in the corresponding channel. Here, for different channels, data can be distributed according to the following strategy: the channel with the earliest sending time sends the oldest and longest segments. For channels with the same transmission time, fragments may be transmitted in an order of channel numbers from small to large or from large to small. Or, Each channel with the earliest transmission time transmits a segment of data till the second earliest transmission time on other channel ends, then starting from the second earliest transmission time, each channel continues to transmit a segment of data till the third earliest transmission time ends and so on, till the transmission is completed. When multiple channels can be transmitted at a certain transmission time, fragments can be transmitted in the order of channel numbers from small to large or from large to small.

A centralized implementations proposed by an embodiment of the present disclosure is illustrated in the following.

Figure 4:
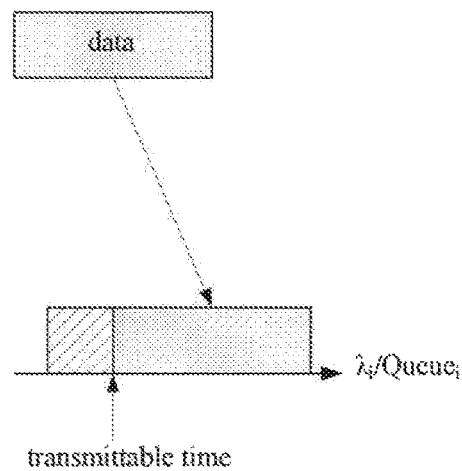
FIG. 4 is a schematic diagram of an embodiment for data distribution/transmission where a destination ONU is a single-wavelength ONU according to an embodiment of the present disclosure.

FIG. 4 is a schematic diagram of an embodiment for data distribution/transmission embodiment where a destination ONU is a single-wavelength ONU according to an embodiment of the present disclosure. In FIG. 4, a shaded part indicates that data is already being transmitted. As shown in FIG. 4, assuming that the destination ONU transmitting data is a single-wavelength ONU and the ONU supports wavelength i, i.e. wavelength $\lambda_i$, the data is directly distributed/transmitted at the transmittable time on the supported wavelength.

Figure 5:
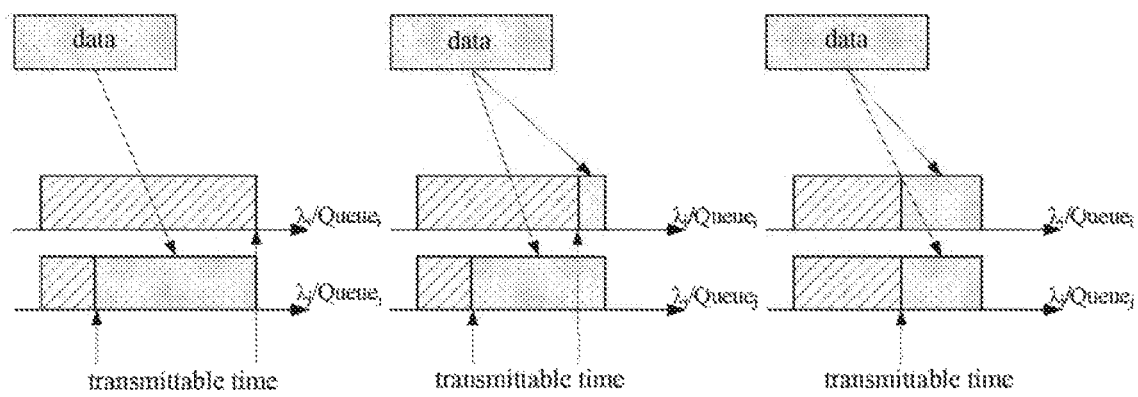
FIG. 5 is a schematic diagram of an embodiment for data distribution/transmission where the destination ONU is a two-wavelength ONU according to an embodiment of the present disclosure.

FIG. 5 is a schematic diagram of an embodiment for data distribution/transmission where the destination ONU is a two-wavelength ONU according to an embodiment of the present disclosure. In FIG. 5, shaded parts indicate that data is already being transmitted. As shown in FIG. 5, assuming that the destination ONU transmitting data is a 2-wavelength ONU, and the ONU supports wavelengths $\lambda_i$ and $\lambda_j$. In the left part in FIG. 5, the transmittable start time point of the wavelength $\lambda_j$ is the earliest, and the data is preferentially transmitted at the wavelength $\lambda_j$, and the transmission is completed before the transmittable time of the wavelength $\lambda_i$, so the data is completely transmitted at the wavelength $\lambda_j$. In the middle part in FIG. 5, the transmittable start time point of wavelength $\lambda_j$ is the earliest, and the data is preferentially transmitted at wavelength $\lambda_j$, but the transmission cannot be completed before the transmittable time of wavelength $\lambda_i$, so the data continues to be transmitted evenly between wavelength $\lambda_i$ and wavelength $\lambda_j$ at the beginning of the transmittable time of wavelength $\lambda_j$. In the right part in FIG. 5, the transmittable times of wavelength $\lambda_i$ and wavelength $\lambda_j$ are the same, and the data is transmitted evenly at wavelength $\lambda i$ and wavelength $\lambda_j$.

Figure 6:
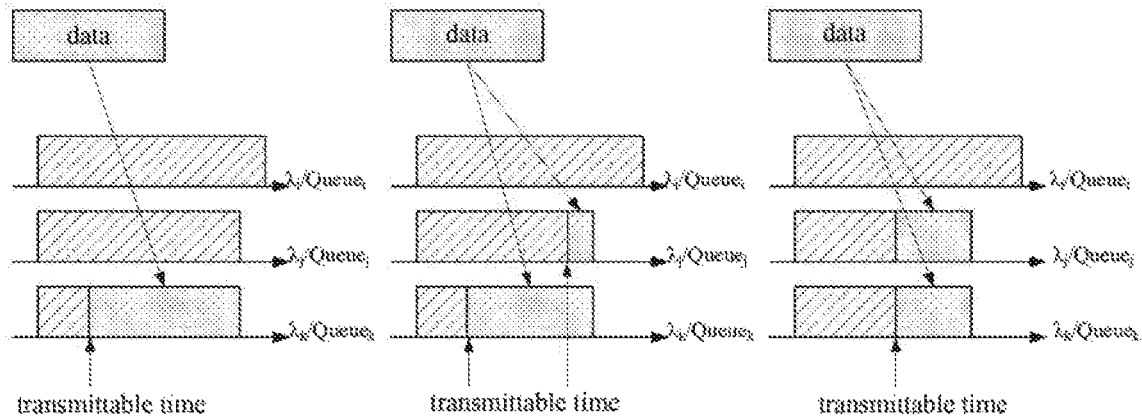
FIG. 6 is a schematic diagram of a first embodiment for data distribution/transmission where the destination ONU is a 3-wavelength ONU according to an embodiment of the present disclosure.

FIG. 6 is a schematic diagram of a first embodiment for data distribution/transmission where the destination ONU is a 3-wavelength ONU according to an embodiment of the present disclosure. In FIG. 6, shaded parts indicate that data is already being transmitted. As shown in FIG. 6, assuming that the destination ONU transmitting data is a 3-wavelength ONU, and the ONU supports wavelengths $\lambda_i$, $\lambda_j$, and $\lambda_k$. In the left part in FIG. 6, the transmittable start time point of wavelength $\lambda_k$ is the earliest, and the data is preferentially transmitted at wavelength $\lambda_k$, and the transmission is completed before the transmittable times of wavelength $\lambda_i$ and wavelength $\lambda_j$, so the data is completely transmitted at wavelength $\lambda_k$. In the middle part in FIG. 6, the transmittable start time point of wavelength $\lambda_k$ is the earliest, and the data is preferentially transmitted at wavelength $\lambda_k$, but it is assumed that the transmission cannot be completed before the transmittable time of wavelength $\lambda_j$, so the data continues to be transmitted evenly at wavelength $\lambda_j$ and wavelength $\lambda_k$ at the beginning of the transmittable time of wavelength and the transmission is completed before the transmittable time of wavelength $\lambda_i$. In the right part in FIG. 6, the transmittable times of wavelength $\lambda_j$ and wavelength $\lambda_k$ is the same and the earliest, the data is preferentially transmitted evenly at wavelength $\lambda_j$ and wavelength $\lambda_k$, and the transmission is completed before the transmittable time of wavelength $\lambda_i$.

Figure 7:
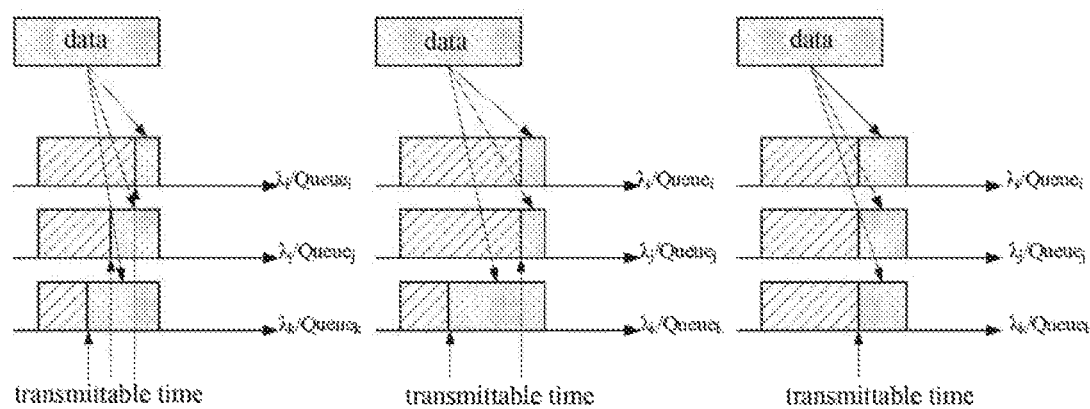
FIG. 7 is a schematic diagram of a second embodiment for data distribution/transmission where the destination ONU is a 3-wavelength ONU according to an embodiment of the present disclosure.

FIG. 7 is a schematic diagram of a second embodiment for data distribution/transmission where the destination ONU is a 3-wavelength ONU according to an embodiment of the present disclosure. In FIG. 7, shaded parts indicate that data is already being transmitted. As shown in FIG. 7, assuming that the destination ONU transmitting data is a 3-wavelength ONU, and the ONU supports wavelengths $\lambda_i$, $\lambda_j$, and $\lambda_k$. In the left part in FIG. 7, the transmittable start time point of wavelength $\lambda_k$ is the earliest, and data is preferentially transmitted at wavelength $\lambda_k$, but the transmission cannot be completed before the transmittable time of wavelength $\lambda_j$, so data continues to be transmitted evenly at wavelength $\lambda_j$ and wavelength $\lambda_k$, but the data transmission still cannot be completed before the transmittable time of wavelength $\lambda_i$, so data continues to be transmitted evenly at wavelength $\lambda_i$, wavelength $\lambda_j$ and wavelength $\lambda_k$ at the beginning of the transmittable time of wavelength $\lambda_i$. In the middle part in FIG. 7, the transmittable start time point of wavelength $\lambda_k$ is the earliest, and data is preferentially transmitted at wavelength $\lambda_k$, but the data transmission cannot be completed before the (same) transmittable time of wavelength $\lambda_i$ and wavelength $\lambda_j$. Therefore, at the beginning of the transmittable times of wavelength $\lambda_i$ and wavelength $\lambda_j$, and data continues to be transmitted evenly at wavelength $\lambda_i$, wavelength $\lambda_j$ and wavelength $\lambda_k$. In the right part in FIG. 7, the transmittable times of wavelength $\lambda_i$, wavelength $\lambda_j$ and wavelength $\lambda_k$ are the same, and the data are transmitted evenly at wavelength $\lambda_i$, wavelength $\lambda_j$ and wavelength $\lambda_k$.

Figure 8:
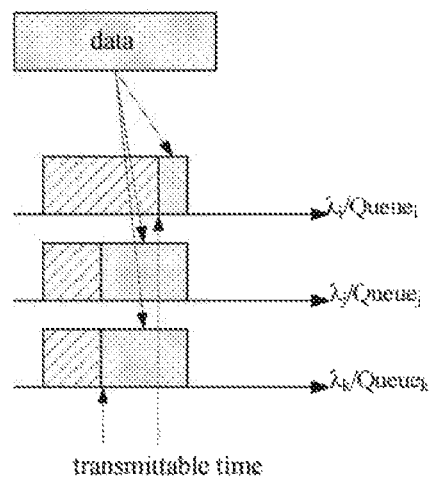
FIG. 8 is a schematic diagram of a third embodiment for data distribution/transmission where the destination ONU is a 3-wavelength ONU according to an embodiment of the present disclosure.

FIG. 8 is a schematic diagram of a third embodiment for data distribution/transmission where the destination ONU is a 3-wavelength ONU according to an embodiment of the present disclosure. In FIG. 8, shaded parts indicate that data is already being transmitted. As shown in FIG. 8, assuming that the destination ONU transmitting data is a 3-wavelength ONU, the ONU supports the wavelength $\lambda_i$, wavelength $\lambda_j$ and wavelength $\lambda_k$ which have the same earliest transmittable time, data is preferentially transmitted evenly at wavelength $\lambda_j$ and wavelength $\lambda_k$, and the transmission cannot be completed before the transmittable time of wavelength $\lambda_i$, therefore, data continues to be transmitted evenly at wavelength $\lambda_i$, wavelength $\lambda_j$ and wavelength $\lambda_k$ at the beginning of the transmittable time of wavelength $\lambda_i$.

FIGS. 9 to 12 are schematic diagrams of four embodiments for data distribution/transmission where the destination ONU is a 4-wavelength ONU. In these embodiments, shaded parts indicate that data is already being transmitted, assuming that the destination ONU transmitting data is a 4-wavelength ONU, the ONU supports wavelength $\lambda_h$, wavelength $\lambda_i$, wavelength $\lambda_j$, and wavelength $\lambda_k$.

Figure 9:
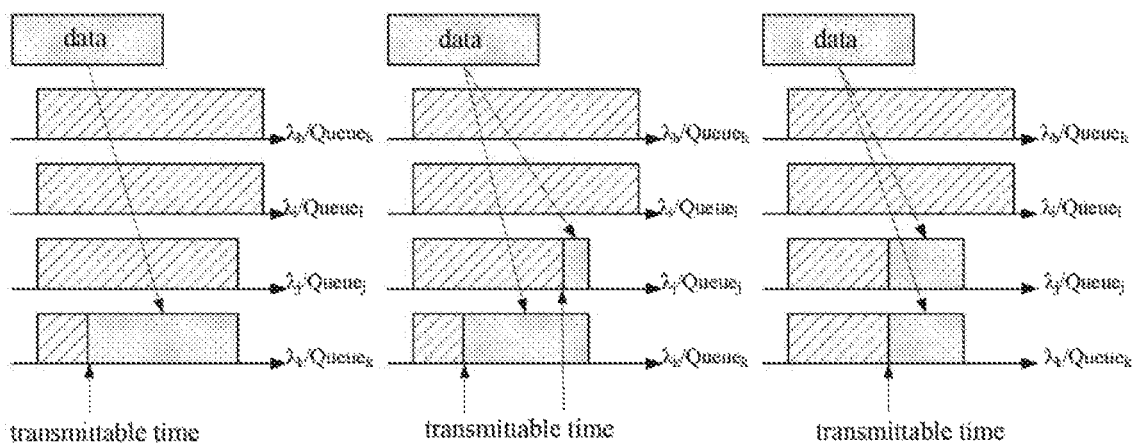
FIG. 9 is a schematic diagram of a first embodiment for data distribution/transmission where the destination ONU is a 4-wavelength ONU according to an embodiment of the present disclosure.

In the left part in FIG. 9, the transmittable start time point of wavelength $\lambda_k$ is the earliest, and data is preferentially transmitted at wavelength $\lambda_k$, and the transmission is completed before the transmittable times of wavelength $\lambda_h$, wavelength $\lambda_i$, and wavelength $\lambda_j$, so the data is completely transmitted at wavelength $\lambda_k$. In the middle part in FIG. 9, the transmittable start time point of wavelength $\lambda_k$ is the earliest, and the data is preferentially transmitted at wavelength $\lambda_k$, but the data transmission cannot be completed before the second earliest transmittable time of the wavelength $\lambda_j$, so the data continues to be transmitted evenly between wavelength $\lambda_j$ and wavelength $\lambda_k$ at the beginning of the transmittable time of wavelength $\lambda_j$, and the transmission is completed before the transmittable times of wavelength $\lambda_h$ and wavelength $\lambda_i$. In the right part in FIG. 9, the transmittable times of wavelength $\lambda_j$ and wavelength $\lambda_k$ are the same and the earliest, and the data is preferentially transmitted evenly at wavelength $\lambda_j$ and wavelength $\lambda_k$, and the transmission is completed before the transmittable times of wavelength $\lambda_h$ and wavelength $\lambda_i$.

Figure 10:
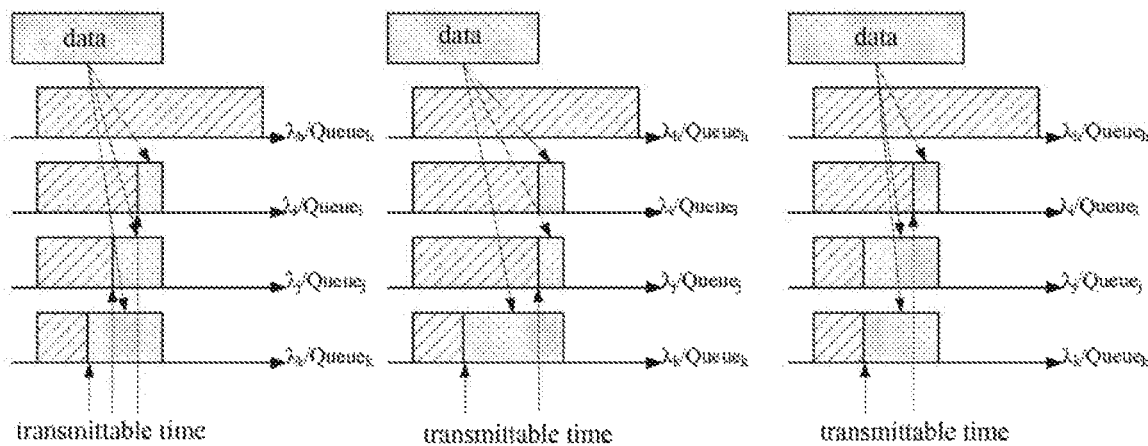
FIG. 10 is a schematic diagram of a second embodiment for data distribution/transmission where the destination ONU is a 4-wavelength ONU according to an embodiment of the present disclosure.

In the left part in FIG. 10, the transmittable start time point of wavelength $\lambda_k$ is the earliest, and the data is preferentially transmitted at wavelength $\lambda_k$, but the data transmission cannot be completed before the transmittable time of wavelength $\lambda_j$. Therefore, the data continues to be transmitted evenly at wavelength $\lambda_k$ and wavelength $\lambda_j$ at the beginning of the transmittable time of wavelength $\lambda_j$, but the data transmission cannot be completed before the transmittable time of wavelength $\lambda_i$. Therefore, at the beginning of the transmittable time of wavelength $\lambda_i$, the data continues to be transmitted evenly at wavelength $\lambda_i$, wavelength $\lambda_j$ and wavelength $\lambda_k$, and the transmission is completed before the transmittable time of wavelength $\lambda_h$. In the middle part in FIG. 10, the transmittable start time point of wavelength $\lambda_k$ is the earliest, and the data is preferentially transmitted at wavelength $\lambda_k$, but the data transmission cannot be completed before the (same) transmittable time of wavelength $\lambda_i$ and wavelength $\lambda_j$. Therefore, at the beginning of the transmittable time of wavelength $\lambda_i$ and wavelength $\lambda_j$, the data continues to be transmitted evenly at wavelength $\lambda_i$, wavelength $\lambda_j$ and wavelength $\lambda_k$, and the data transmission is completed before the transmittable time of wavelength $\lambda_h$. In the right part in FIG. 10, it is assumed that the transmittable times of wavelength $\lambda_j$ and wavelength $\lambda_k$ are the same and earliest, and the data is preferentially transmitted evenly at wavelength $\lambda_j$ and wavelength $\lambda_k$, but the data transmission cannot be completed before the transmittable time of wavelength $\lambda_i$. Therefore, the data continues to be transmitted evenly at wavelength $\lambda_i$, wavelength $\lambda_j$ and wavelength $\lambda_k$ at the beginning of the transmittable time of wavelength $\lambda_i$, and the data transmission is completed before the transmittable time of wavelength $\lambda_h$.

Figure 11:
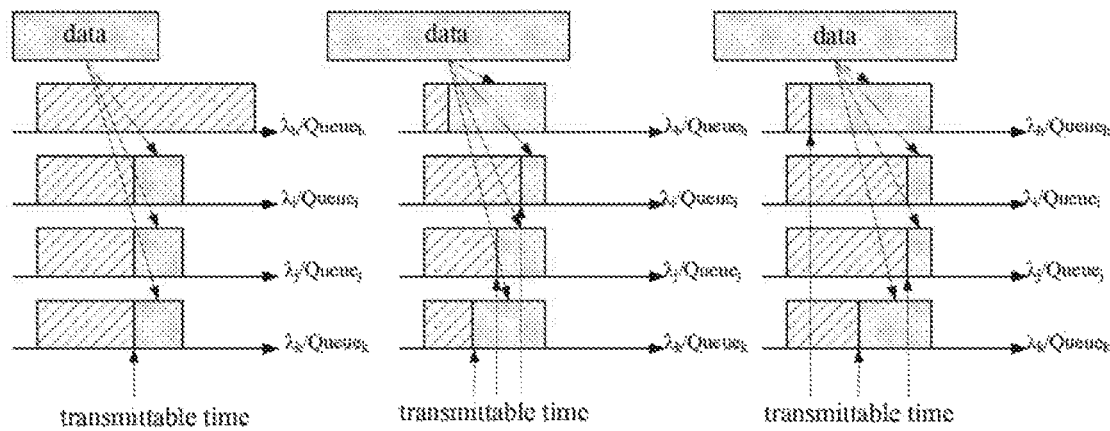
FIG. 11 is a schematic diagram of a third embodiment for data distribution/transmission where the destination ONU is a 4-wavelength ONU according to an embodiment of the present disclosure.

In the left part in FIG. 11, it is assumed that the transmittable times of wavelength $\lambda_i$, wavelength $\lambda_j$ and wavelength $\lambda_k$ are the same and earliest, at the beginning of the transmittable time of wavelength $\lambda_i$, wavelength $\lambda_j$ and wavelength $\lambda_k$, the data are transmitted evenly on the three channels, and the data transmission is completed before the transmittable time of wavelength $\lambda_h$. In the middle part in FIG. 11, it is assumed that the transmittable start time point of the wavelength $\lambda_h$ is the earliest, and the data is preferentially transmitted at the wavelength $\lambda_h$, at the beginning of the transmittable time of the wavelength $\lambda_k$, the data continues to be transmitted evenly at the wavelength $\lambda_h$ and the wavelength $\lambda_k$, at the beginning of the transmittable time of the wavelength $\lambda_j$ the data continues to be transmitted evenly at the wavelength $\lambda_h$, the wavelength $\lambda_j$ and the wavelength $\lambda_k$, at the beginning of the transmittable time of the wavelength $\lambda_i$, and the data continues to be transmitted evenly at the wavelength $\lambda_h$, the wavelength $\lambda_i$, the wavelength $\lambda_j$ and the wavelength $\lambda_k$. In the right part in FIG. 11, it is assumed that the transmittable start time point of the wavelength $\lambda_h$ is the earliest, the data is preferentially transmitted at the wavelength $\lambda_h$, at the beginning of the transmittable time of the wavelength $\lambda_k$, the data continues to be transmitted evenly at the wavelength $\lambda_h$ and the wavelength $\lambda_k$, the transmittable times of the wavelength $\lambda_i$ and the wavelength $\lambda_j$ are the same, and at the beginning of the transmittable time of the wavelength $\lambda_i$ and the wavelength $\lambda_j$, the data continues to be transmitted evenly at the wavelength $\lambda_h$, the wavelength $\lambda_i$, the wavelength $\lambda_j$ and the wavelength $\lambda_k$.

Figure 12:
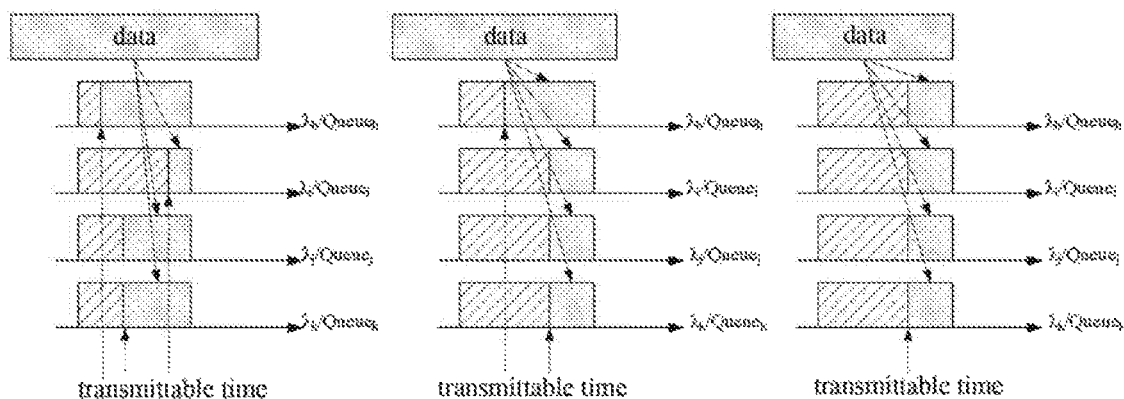
FIG. 12 is a schematic diagram of a fourth embodiment for data distribution/transmission where the destination ONU is a 4-wavelength ONU according to an embodiment of the present disclosure.

In the left part in FIG. 12, it is assumed that the transmittable start time point of the wavelength $\lambda_h$ is the earliest, the data is preferentially transmitted at the wavelength $\lambda_h$, the transmittable times of the wavelength $\lambda_j$ and the wavelength $\lambda_k$ are the same, at the beginning of the transmittable time of the wavelength $\lambda_j$ and the wavelength $\lambda_k$, the data continues to be transmitted evenly at the wavelength $\lambda_h$, the wavelength $\lambda_j$ and the wavelength $\lambda_k$, at the beginning of the transmittable time of the wavelength $\lambda_i$, and the data continues to be transmitted evenly at the wavelength $\lambda_h$, the wavelength $\lambda_i$, the wavelength $\lambda_j$ and the wavelength $\lambda_k$ channels. In the middle part in FIG. 12, it is assumed that the transmittable start time point of the wavelength $\lambda_h$ is the earliest, and the data is preferentially transmitted at the wavelength $\lambda_h$, the transmittable times of the wavelength $\lambda_i$, the wavelength $\lambda_j$, and the wavelength $\lambda_k$ are the same, and at the beginning of the wavelength $\lambda_i$, the wavelength $\lambda_j$, and the wavelength $\lambda_k$, the data continues to be transmitted evenly at the wavelength $\lambda_i$, the wavelength $\lambda_j$, and the wavelength $\lambda_k$. In the right part in FIG. 12, it is assumed that the transmittable times of wavelength $\lambda_h$, wavelength $\lambda_i$, wavelength $\lambda_j$ and wavelength $\lambda_k$ are the same, and data is transmitted evenly at wavelength $\lambda_h$, wavelength $\lambda_i$, wavelength $\lambda_j$ and wavelength $\lambda_k$.

Data enters different channels, and transmittable times of various channel are different or the same. 2-channel is taken as an example, the same is true for the case of more than 2 channels.

Figure 13:
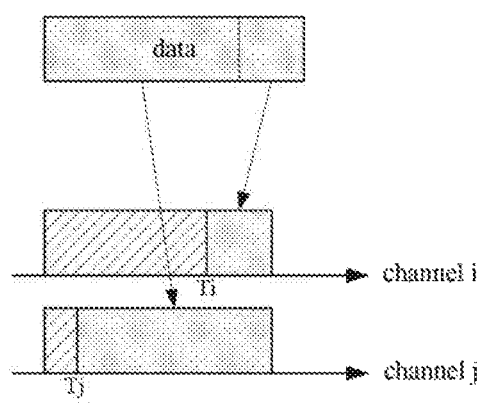
FIG. 13 is a schematic diagram of a first embodiment of data entering 2 channels according to an embodiment of the present disclosure.

FIG. 13 is a schematic diagram of the first embodiment of data entering 2 channels according to an embodiment of the present disclosure. Shaded portions indicate that data is already being transmitted. As shown in FIG. 13, the transmittable times of wavelength $\lambda_i$ and wavelength $\lambda_j$ are Ti and Tj, respectively, and the data length is L. Assuming that Tj is earlier than Ti, data is preferentially transmitted at wavelength $\lambda_j$, the data transmitted at wavelength $\lambda_j$ is the front F(Tj−Ti)+[L−F(Tj−Ti)]/2 portion, and the data transmitted at wavelength $\lambda_i$ is the rest [L−F(Tj−Ti)]/2 portion, where F(t) is the length of data which can be transmitted during time t. In the process of data transmission, it is necessary to indicate the relationship between data fragments, for example, the data number is N, the data fragment number on wavelength $\lambda_j$ is 0, and the data fragment number on wavelength $\lambda_i$ is 1. That is, during data transmission, the data fragment on wavelength $\lambda_j$ needs to indicate data fragment number being 0 and data sequence number being N, and the data fragment on wavelength $\lambda_i$ needs to indicate data fragment number being 1 and data sequence number being N. Thus, the receiving end assembles the two data fragments according to the data sequence number and data fragment number, and the data fragment with the fragment number 0 is placed before the data fragment with the fragment number 1.

Figure 14:
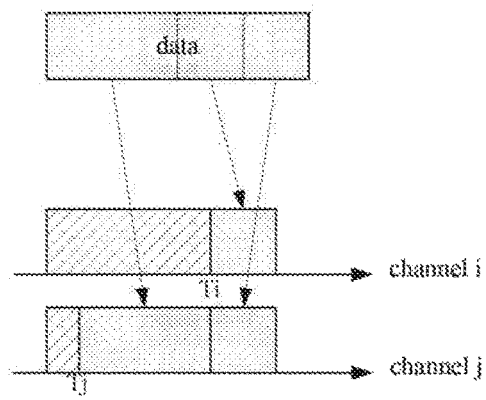
FIG. 14 is a schematic diagram of a second embodiment of data entering 2 channels according to an embodiment of the present disclosure.

FIG. 14 is a schematic diagram of a second embodiment of data entering 2 channels according to an embodiment of the present disclosure. Shaded portions indicate that data is already being transmitted. As shown in FIG. 14, the transmittable times of wavelength $\lambda_i$ and wavelength $\lambda_j$ are Ti and Tj, respectively, the data length is L, Tj is earlier than Ti, and the data is preferentially transmitted at wavelength $\lambda_j$. Assuming that the data transmitted at wavelength $\lambda_j$ is the first F(Tj−Ti) portion, then the data transmitted at wavelength $\lambda_i$ is the following [L−F(Tj−Ti)]/2 portion, and then the data transmitted at wavelength $\lambda_j$ is the last [L−F(Tj)] portion, where F(t) is the length of data which can be transmitted during time t. In the process of data transmission, it is necessary to indicate the relationship between data fragments, for example, the data number is N, the data fragment number on wavelength $\lambda_j$ is 0, and the data fragment number on wavelength $\lambda_i$ is 1. That is, during data transmission, the data fragment on wavelength $\lambda_j$ needs to indicate data fragment number being 0 and data sequence number being N, and the data fragment on wavelength $\lambda_i$ needs to indicate data fragment number being 1 and data sequence number being N. Thus, the receiving end assembles the two data fragments according to the data sequence number and data fragment number, the front F(Tj−Ti) data with fragment number 0 is placed in the front, the data fragment with fragment number 1 in the middle, and the rest [L−F(Tj−Ti))]/2 data with fragment number 0 in the last.

Figure 15:
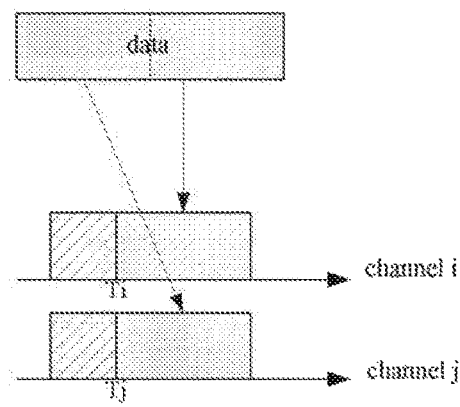
FIG. 15 is a schematic diagram of a third embodiment of data entering 2 channels according to an embodiment of the present disclosure.

FIG. 15 is a schematic diagram of a third embodiment of data entering 2 channels according to an embodiment of the present disclosure. Shaded portions indicate that data is already being transmitted. As shown in FIG. 15, the transmittable times of wavelength $\lambda_i$ and wavelength $\lambda_j$ are Ti and Tj, respectively, and the data length is L, and Tj are the same as Ti, data are transmitted evenly at wavelength $\lambda_i$ and wavelength $\lambda_j$. Assuming that the first L/2 portion of data is transmitted at wavelength $\lambda_j$ and the second L/2 portion is transmitted at wavelength $\lambda_i$. In the process of data transmission, it is necessary to indicate the relationship between data fragments, for example, the data number is N, the data fragment number on wavelength $\lambda_j$ is 0, and the data fragment number on wavelength $\lambda_i$ is 1. That is, during data transmission, the data fragment on wavelength $\lambda_j$ needs to indicate data fragment number being 0 and data sequence number being N, and the data fragment on wavelength $\lambda_i$ needs to indicate data fragment number being 1 and data sequence number being N. Thus, the receiving end assembles the two data fragments according to the data sequence number and data fragment number, and the data fragment with the fragment number 0 is placed before the data fragment with the fragment number 1.

There is a difference between uplink data transmission and downlink data transmission, that is, the uplink transmission of ONU needs an uplink bandwidth allocated by OLT, ONU acquires uplink bandwidth at the supported wavelength, the start position/time of the uplink bandwidth is the transmittable start time point, and there is one more end position/end time point for the uplink bandwidth, that is, the transmittable end time point. In embodiments of FIGS. 4 to 9, the number of the transmittable channels increases when the next transmittable start time point is reached, and data continues to be transmitted evenly on updated channels. Considering the transmittable end time point of the uplink bandwidth, in embodiments of FIGS. 4 to 9, besides the case that the number of the transmittable channels increases when the next transmittable start time point is reached, a case that the number of the transmittable channels decreases when the transmittable end time point is reached is to be considered. That is, the number of the transmittable channels may increase or decrease when a transmittable start time point and/or a transmittable end time point is reached, data continues to be transmitted evenly on updated channels. As to the case for a transmittable end time point, the channel update and data transmission are similar to those of the case for a transmittable start time point, which will not be described here. Here, only the case of two channels is used as an example to illustrate that data enters different channels, and the same is true for more than two channels.

Figure 16:
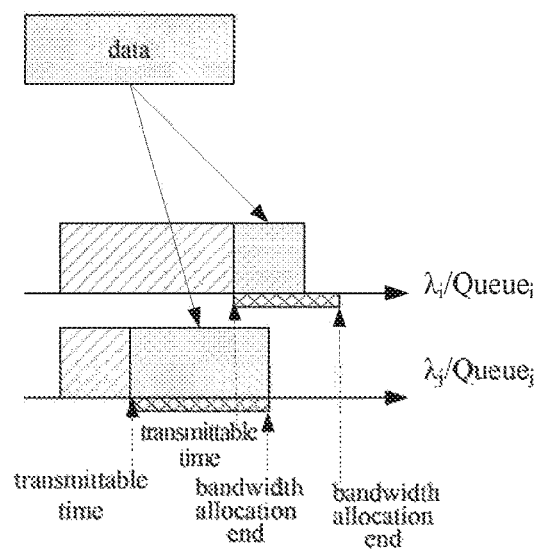
FIG. 16 is a schematic diagram of a bandwidth allocation embodiment of data entering 2 channels in uplink according to an embodiment of the present disclosure.

FIG. 16 is a schematic diagram of of a bandwidth allocation embodiment of data entering 2 channels in uplink according to an embodiment of the present disclosure, where a slash shaded part indicates that data is already being transmitted and a slash grid shaded part indicates bandwidth allocation. As shown in FIG. 16, assuming that the transmittable start time point of wavelength $\lambda_j$ is the earliest, data isbe preferentially transmitted at wavelength $\lambda_j$, at the beginning of the transmittable time of wavelength $\lambda_i$, data continues to be transmitted evenly at wavelength $\lambda_i$ and wavelength $\lambda_j$ until the bandwidth allocation of wavelength $\lambda_j$ ends, data transmission at wavelength $\lambda_j$ ends, and data continue to be transmitted at wavelength $\lambda_i$ until transmission is completed.

Figure 17:
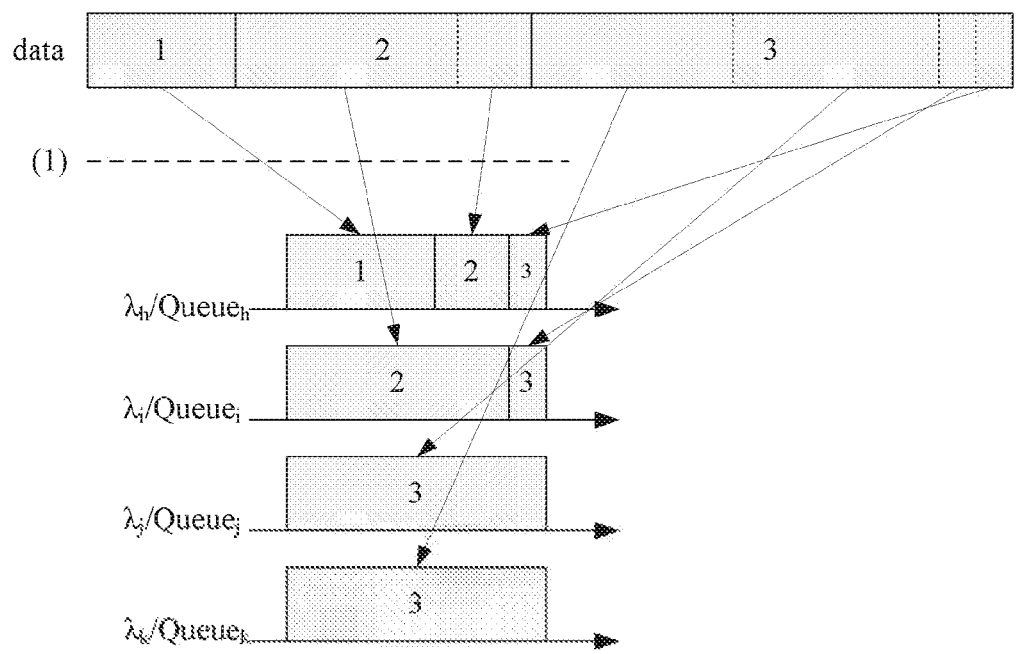
FIG. 17 is a schematic diagram of a first embodiment of multiple-channel data transmission according to an embodiment of the present disclosure.
Figure 18:
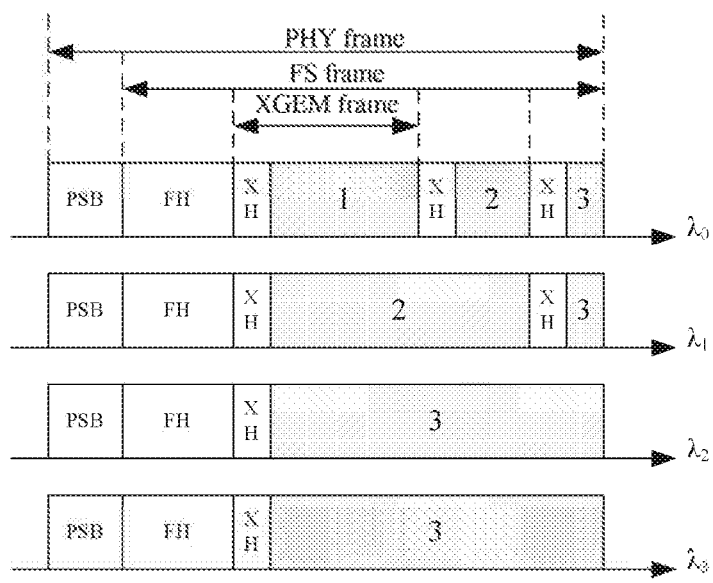
FIG. 18 is a schematic diagram of a first embodiment of ITU-T data downlink transmission based on PON architecture according to an embodiment of the present disclosure.
Figure 19:
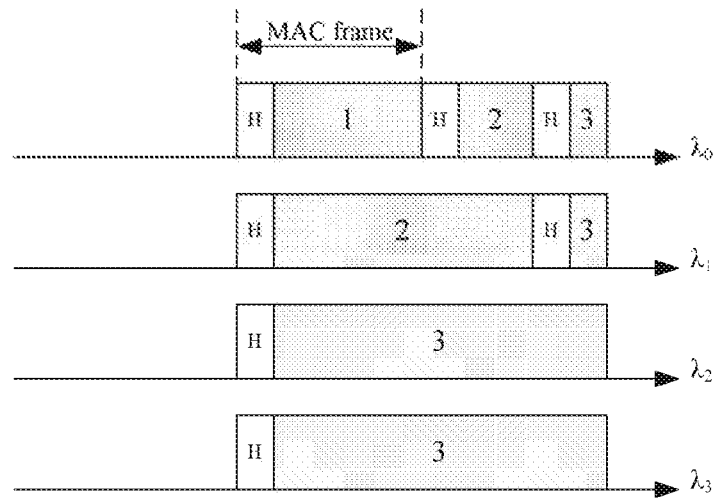
FIG. 19 is a schematic diagram of a first embodiment of IEEE data downlink transmission based on PON architecture according to an embodiment of the present disclosure.

FIG. 17 is a schematic diagram of a first embodiment of multiple-channel data transmission according to an embodiment of the present disclosure. FIG. 18 is a schematic diagram of a first embodiment of ITU-T data downlink transmission based on PON architecture according to an embodiment of the present disclosure. In ITU-T framing, data sequence numbers and data fragment numbers are carried in XGEM header (XH). FIG. 19 is a schematic diagram of a first embodiment of IEEE data downlink transmission based on PON architecture according to an embodiment of the present disclosure. In IEEE framing, data sequence numbers and data fragment numbers are carried in a frame header (H). For data1, assuming its destination ONU only supports wavelength i, data1 will be completely transmitted on wavelength i according to the scheme provided by the present disclosure.

For data2, assume that its destination ONU supports wavelength i and wavelength j. In this embodiment, assume that one part of data2 can be transmitted at wavelength i and the other part at wavelength j according to the transmittable states of the supported wavelength i and wavelength j, and ensure that the transmission end time points of data2 point at wavelength i and wavelength j are the same. The specific implementation is shown in FIG. 13, FIG. 14 and FIG. 15, and will not be described here.

For data 3, assume that its destination ONU supports wavelength h, wavelength i, wavelength j, and wavelength k. In this embodiment, assume that data 3 can be divided into several parts which are transmitted at wavelength h, wavelength i, wavelength j, and wavelength k respectively according to the transmittable states of wavelength h, wavelength i, wavelength j, and wavelength k, that is, data 3 can be transmitted in four channels, and it is ensured that the transmission end time points of data 3 on the four channels are the same. The specific implementation is shown in FIG. 9, FIG. 10, FIG. 11 and FIG. 12, and will not be described here.

Figure 20:
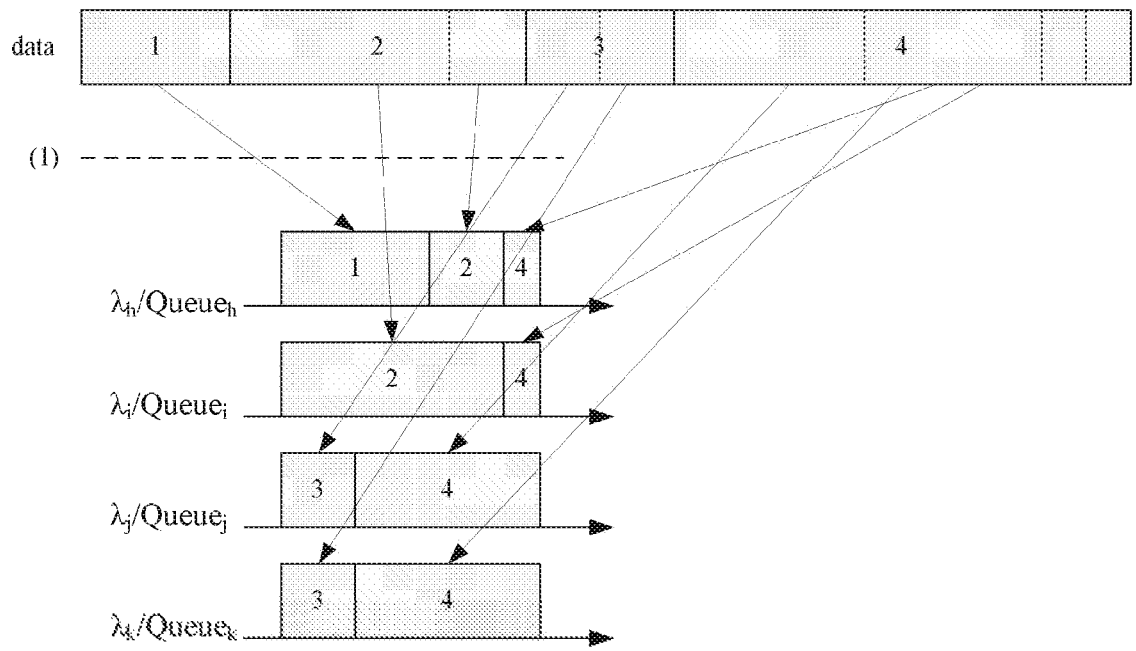
FIG. 20 is a schematic diagram of a second embodiment of multiple-channel data transmission according to an embodiment of the present disclosure.
Figure 21:
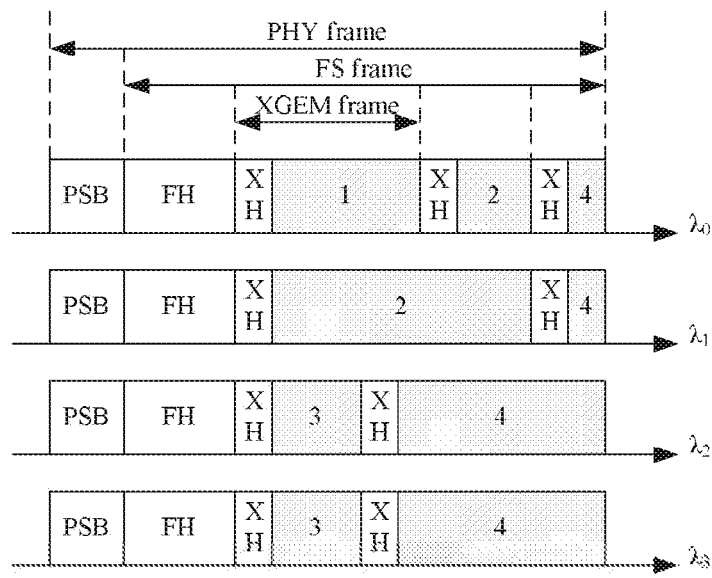
FIG. 21 is a schematic diagram of a second embodiment of ITU-T data downlink transmission based on PON architecture according to an embodiment of the present disclosure.
Figure 22:
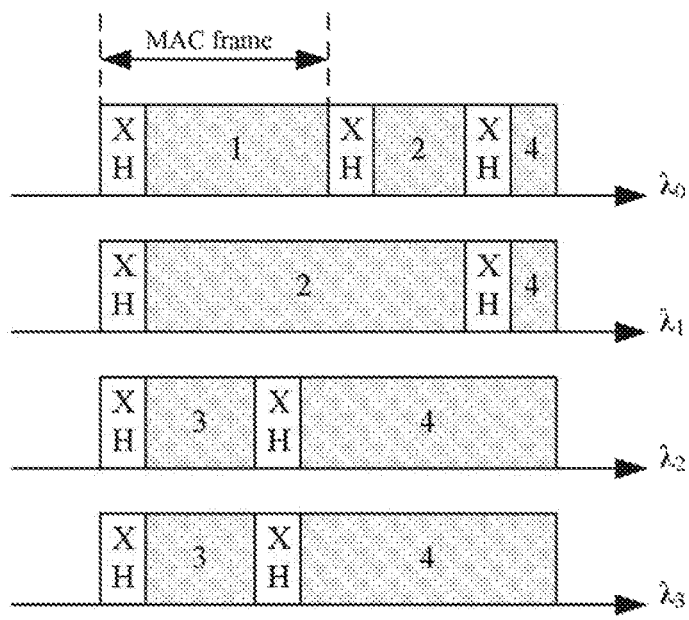
FIG. 22 is a schematic diagram of a second embodiment of IEEE data downlink transmission based on PON architecture according to an embodiment of the present disclosure.

FIG. 20 is a schematic diagram of a second embodiment of multiple-channel data transmission according to an embodiment of the present disclosure. FIG. 21 is a schematic diagram of a second embodiment of ITU-T data downlink transmission based on PON architecture according to an embodiment of the present disclosure. FIG. 22 is a schematic diagram of a second embodiment of IEEE data downlink transmission based on PON architecture according to an embodiment of the present disclosure. For data1, assuming its destination ONU supports only wavelength i, data1 will be completely transmitted on wavelength i according to the scheme provided by the present disclosure.

For data2, assume that its destination ONU supports wavelength i and wavelength j. In this embodiment, assume that a part of data2 can be transmitted at wavelength i and a part at wavelength j according to the transmittable state of supporting wavelength i and wavelength j, ensuring that the transmission end time points of data2 at wavelength I and wavelength j are the same. The specific implementation is shown in FIG. 13, FIG. 14 and FIG. 15, and will not be described here.

For data3, assuming that its destination ONU supports wavelength h, wavelength i, wavelength j and wavelength k, unlike the first embodiment, the transmittable time of wavelength h and wavelength i are later than the transmittable times of wavelength j and wavelength k, that is, transmitting data3 at wavelength h and wavelength i will cause a greater delay than transmitting data3 at wavelength j and wavelength k, so data3 is not suitable for transmitting at wavelength h and wavelength i, but is more suitable for transmitting at wavelength j and wavelength k, ensuring that the transmission end time points of the transmissions of data 2 at wavelength j and wavelength k are the same. The specific implementation is shown as in FIG. 9, FIG. 10, FIG. 11 and FIG. 12, and will not be described here.

For data4, assuming its destination ONU supports wavelength h, wavelength i, wavelength j, and wavelength k, data4 is transmitted in the same manner as data3 in FIG. 17, and will not be described here.

Figure 23:
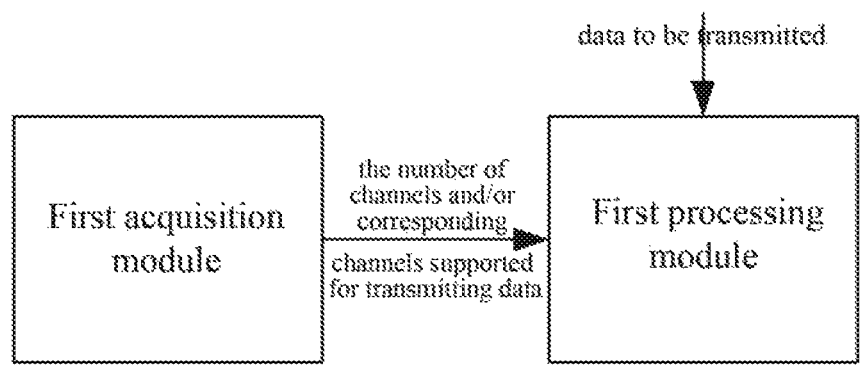
FIG. 23 is a schematic diagram of a first embodiment of the structure of a network device in accordance with an embodiment of the present disclosure.

FIG. 23 is a structural diagram of a first embodiment of the structure of a network device in accordance with an embodiment of the present disclosure. As shown in FIG. 23, the device at least includes a first acquisition module and a first processing module.

The first acquisition module is configured to acquire the number of channels and/or the corresponding channels supported for transmitting data and the transmittable states of the supported channels.

The first processing module is configured to distribute the data to be transmitted to one or more supported channels for transmitting, herein the data is preferentially transmitted on a channel with the earliest transmittable start time point, and transmission end time points of channels for transmitting the data are similar or data transmissions end at a transmittable end time point.

Herein, that the transmission end time points of the channels for transmitting the data are similar means that the transmission end time points of the channels for transmitting the data are the same; or, a difference between the transmission end time points of the channels for transmitting the data is less than a preset time difference threshold, where the time difference threshold can be several bytes, such as 1 byte, 4 bytes, etc.

The first acquisition module is configured to acquire a destination ONU of the data to be transmitted, a number of channels and/or corresponding channels supported by the destination ONU, and transmittable states of the supported channels.

Accordingly, the first processing module is configured to:
according to the acquired number of channels of the destination ONU and the transmittable states of the channels, distribute the data to be transmitted to one or more supported channels for transmitting, herein the data is preferentially transmitted on the channel with the earliest transmittable start time point, and the transmission end time points of the channels for transmitting the data are similar or data transmissions end at the transmittable end time point.

When the destination ONU is a single-channel ONU, that is, the destination ONU supports a single channel, the data to be transmitted starts to be directly and completely transmitted on the channel, and the sequence number and/or length of the data is indicated, and there is no fragmentation at this time.

When the destination ONU is a two-or-more-channel ONU, i.e. the destination ONU supports two or more channels, if data may be completely transmitted on a certain channel with the earliest transmittable start time point (the transmittable start time point of this channel is the earliest, and the transmittable start time points of other channels are later than that of the channel, and the data transmission may not reach transmittable start time points of other channels), then data is completely transmitted on this channel and the sequence number and/or length of data is indicated, and there is no fragmentation at this time. If the data cannot be completely transmitted on a certain channel, then the data is fragmented to be distributed on multiple channels for transmitting, the sequence number and fragmentation situation and/or length of the data on each channel are indicated.

Further,

The first processing module is further configured to, when there are multiple channels with the same earliest transmittable start time point, preferentially transmit the data evenly on the multiple channels.

Further,

The first processing module is further configured to when the number of channels increases at a next transmittable start time point and/or decreases at the transmittable end time point, continue to transmit the data evenly on updated channels until the data transmission is completed or all channels reach the transmission end time points.

The first processing module is further configured to encapsulate the data or data fragments to be transmitted on each channel into data frames and transmit the data frames to the destination ONU, and carry at least one of the following in the data frame: data sequence number, data fragmentation situation, and length.

Further, the first processing module is further configured to allocate an uplink bandwidth to the ONU, and allocate the bandwidth on each channel supported by the ONU, herein bandwidths allocated to one ONU supporting multiple channels overlap; receive data on a channel supported by itself, collect data frames sent by an ONU according to the ONU information and/or the bandwidth allocation, and reassemble the received data accordingly based on data transmission rules.

The optical network device shown in FIG. 23 may be provided in an OLT or may be a separate entity.

Figure 24:
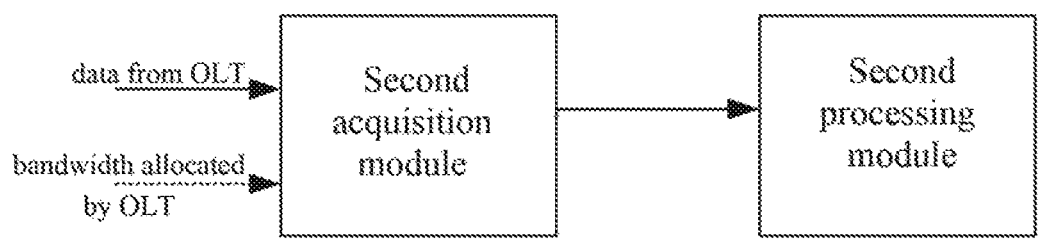
FIG. 24 is a schematic diagram of a second embodiment of the structure of a network device in accordance with an embodiment of the present disclosure.

FIG. 24 is a schematic diagram of a second embodiment of the structure of a network device in accordance with an embodiment of the present disclosure. As shown in FIG. 24, the device at least includes a second acquisition module and a second processing module.

The second acquisition module is configured to receive data on a channel supported by itself; acquire a number of channels and/or corresponding channels supported for transmitting data and the transmittable states of the supported channels.

The second processing module is configured to receive data frames according to channel information and/or address information in the received data frames and local channel information and/or address information of an ONU, and reassemble received data fragments according to a sequence number and fragmentation situation in the data frame.

The second acquisition module is configured to: when an ONU where the optical network device itself is located is a single-channel ONU, that is, the ONU where the optical network device itself is located supports a single channel, receive data frames on the channel and analyze to acquire corresponding data; when an ONU where the optical network device itself is located is a two-or-more-channel ONU, i.e. the ONU where the optical network device itself is located supports two or more channels, receive data frames on the channels supported by itself according to channel information and/or address information, and reassemble the data according to the sequence number and data fragmentation situation in the data frame.

The second acquisition module is further configured to acquire an uplink bandwidth allocated by an OLT on each channel supported by the ONU where the optical network device itself is located and transmittable states of the supported channels.

The second processing module is further configured to distribute the data to be transmitted to one or more supported channels, herein the data is preferentially transmitted on the channel with an earliest transmittable start time point, and transmission end time points of channels for transmitting the data are similar or data transmissions end at a transmittable end time point.

When the ONU where the optical network device itself is located supports a single channel or acquires bandwidth allocation on only one channel, the data to be transmitted starts to be transmitted on the channel from the transmittable start time point and the sequence number and/or length of the data to be transmitted is indicated.

When the ONU where the optical network device itself is located supports two or more channels and acquires bandwidth allocation on the two or more channels, if the data to be transmitted is completely transmitted on a channel with the earliest transmission start time point, the data to be transmitted is transmitted on the channel and the sequence number and/or length of the data to be transmitted is indicated. If the data to be transmitted cannot be completely transmitted on a channel, the data to be transmitted is fragmented to be distributed on multiple channels for transmitting, and the sequence number, fragmentation situation and/or length of the data to be transmitted on each channel are indicated.

Further, the second processing module is further configured to, when there are multiple channels with the same earliest transmittable start time point, preferentially transmit the data evenly on the multiple channels.

Further, the second processing module is further configured to, when the number of channels increases at a next transmittable start time point and/or decreases at the transmittable end time point, continue to transmit data evenly on updated channels until the data transmission is completed or all channels reach the transmission end time points.

The device described in FIG. 24 may be provided in an ONU or may be a separate entity.

All above are only the exemplary embodiments of the present disclosure, and are not used to limit the protection scope of the present disclosure. Any modification, equivalent substitution and improvement made within the essence and principle of the present disclosure should be included in the protection scope of the present disclosure.

INDUSTRIAL APPLICABILITY

With the passive optical network architecture, the method for realizing data transmission with the PON architecture and the optical network device provided by embodiments of the present disclosure, control by OLT supporting multiple wavelengths on ONU supporting different numbers of wavelengths and different wavelengths is realized, flexible binding of channels and full use of bandwidth can be achieved.

The invention claimed is:

1. A method for realizing data transmission with passive optical network (PON) architecture, comprising:

acquiring, by a sender, a number of channels and/or corresponding channels supported and a transmittable state of each supported channel, the transmittable state comprising a transmittable start time point at which the corresponding supported channel becomes available for transmitting data, distributing data to be transmitted to more than one supported channels for transmitting, wherein the data is transmitted on a channel with an earliest transmittable start time point among the more than one supported channels;

receiving, by a receiver, data on supported channels and reassembling the data accordingly based on transmission rules.

2. The method for realizing data transmission according to claim 1, wherein the sender divides the data to be transmitted into a plurality of data fragments, and distributes the data fragments on the more than one supported channels for transmitting, the data fragments are transmitted on the channel with the earliest transmittable start time point.

3. The method for realizing data transmission according to claim 1, the sender encapsulates the data or data fragments to be transmitted on each channel into data frames and transmits the data frames to the receiver, and carries at least one of the following in the data frame: data sequence number, data fragmentation situation, and length.

4. The method for realizing data transmission according to claim 1, wherein when the receiver is an optical line terminal (OLT), the OLT allocates an uplink bandwidth to an optical network unit (ONU) on each channel supported by the ONU; wherein, bandwidths allocated to an ONU supporting a plurality of channels overlap.

5. The method for realizing data transmission according to claim 4, when the sender is an ONU, the ONU acquires the uplink bandwidth allocated by the OLT on the channels supported by the ONU itself.

6. The method for realizing data transmission according to claim 1, when there are a plurality of channels with a same earliest transmittable start time point, the data is transmitted evenly on the plurality of channels.

7. A non-transitory computer readable storage medium, storing computer executable instructions, which are used for implementing the method for realizing data transmission with passive optical network (PON) architecture according to claim 1.

8. An optical network device, comprising a first acquisition module, a first processing module, and a first receiving module; wherein, the first acquisition module is configured to acquire a destination optical network unit (ONU), a number of channels and/or corresponding channels supported by the destination ONU, and a transmittable state of each supported channel, the transmittable state comprising a transmittable start time point at which the corresponding supported channel becomes available for transmitting data;

the first processing module is configured to distribute data to be transmitted to more than one supported channels for transmitting, wherein the data is transmitted on a channel with an earliest transmittable start time point among the more than one supported channels; and divide the data to be transmitted into a plurality of data fragments, distribute the data fragments on the more than one supported channels for transmitting, wherein the data fragments are transmitted on the channel with the earliest transmittable start time point;

the first receiving module is configured to receive data on a channel supported by the destination ONU, collect data frames sent by an ONU according to ONU information and/or bandwidth allocation, and reassemble the received data accordingly based on data transmission rules.

9. The optical network device according to claim 8, the first processing module is further configured to encapsulate the data or data fragments to be transmitted on each channel into data frames and transmit the data frames to the destination ONU, and carry at least one of the following in the data frame: data sequence number, data fragmentation situation, and length.

10. The optical network device according to claim 9, wherein the optical network device is provided in an optical line terminal (OLT) or is a separate entity.

11. The optical network device according to claim 8, the first processing module is further configured to, when there are a plurality of channels with a same earliest transmittable start time point, transmit the data evenly on the plurality of channels.

12. The optical network device according to claim 11, wherein the optical network device is provided in an optical line terminal (OLT) or is a separate entity.

13. The optical network device according to claim 8, wherein the optical network device is provided in an optical line terminal (OLT) or is a separate entity.

14. An optical network device comprising: a second acquisition module, a second processing module, and a second receiving module; wherein, the second acquisition module is configured to acquire a number of channels and/or corresponding channels supported, and a transmittable state of each supported channel, the transmittable state comprising a transmittable start time point at which the corresponding supported channel becomes available for transmitting data;

the second processing module is configured to distribute data to be transmitted to more than one supported channels for transmitting, wherein the data is transmitted on a channel with an earliest transmittable start time point among the more than one supported channels; and divide the data to be transmitted into a plurality of data fragments, distribute the data fragments on the more than one supported channels for transmitting, wherein the data fragments are transmitted on the channel with the earliest transmittable start time point;

the second receiving module is configured to receive data frames according to channel information and/or address information in the received data frames and local channel information and/or address information of an optical network unit (ONU), and reassemble received data fragments according to a sequence number and fragmentation situation in the data frame.

15. The optical network device according to claim 14, wherein the second acquisition module is further configured to acquire an uplink bandwidth allocated by an optical line terminal (OLT) on each channel supported by the ONU where the optical network device itself is located.

16. The optical network device according to claim 15, wherein the second processing module is further configured to: when there are a plurality of channels with a same earliest transmittable start time point, transmit the data evenly on the plurality of channels.

17. The optical network device according to claim 16, wherein the device is provided in an ONU or is a separate entity.

18. The optical network device according to claim 15, wherein the device is provided in an ONU or is a separate entity.

19. The optical network device according to claim 14, wherein the device is provided in an ONU or is a separate entity.

\* \* \* \* \*